US00RE35003E

United States Patent [19]

Takada

[11] E Patent Number: Re. 35,003

[45] **Reissued Date of Patent: * Jul. 25, 1995**

[54] SILVER HALIDE PHOTOGRAPHIC PHOTOSENSITIVE MATERIAL

[75] Inventor: Shunji Takada, Minami-ashigara, Japan

[73] Assignee: Fuji Photo Film Co., Ltd., Kanagawa, Japan

[ * ] Notice: The portion of the term of this patent subsequent to Oct. 29, 2008 has been disclaimed.

[21] Appl. No.: 928,310

[22] Filed: Aug. 12, 1992

Related U.S. Patent Documents

Reissue of:

[64] Patent No.: 5,079,138
Issued: Jan. 7, 1992
Appl. No.: 708,842
Filed: May 30, 1991

U.S. Applications:

[63] Continuation of Ser. No. 436,630, Nov. 15, 1989, abandoned.

[30] Foreign Application Priority Data

Nov. 15, 1988 [JP] Japan ..... 63-288436
Jun. 12, 1989 [JP] Japan ..... 1-149180

[51] Int. Cl.[6] ..... G03C 1/035; G03C 1/08

[52] U.S. Cl. ..... 430/567; 430/569; 430/599; 430/603; 430/605; 430/607; 430/611

[58] Field of Search ..... 430/569, 567, 605, 603, 430/599, 607, 611

[56] References Cited

U.S. PATENT DOCUMENTS

| | | | |
|---|---|---|---|
| 2,448,060 | 8/1948 | Smith et al. | 430/603 |
| 3,047,393 | 7/1962 | Hertz et al. | 430/607 |
| 3,892,574 | 7/1975 | Claes et al. | 430/569 |
| 3,957,490 | 5/1976 | Libeer et al. | 430/599 |
| 4,198,240 | 4/1980 | Mikawa | 430/570 |
| 4,276,374 | 6/1981 | Mifune et al. | 430/611 |
| 4,401,754 | 8/1983 | Suzuki et al. | 430/599 |
| 4,746,600 | 5/1988 | Watanabe et al. | 430/505 |
| 4,806,461 | 2/1989 | Ikeda et al. | 430/567 |
| 5,061,614 | 10/1991 | Takada et al. | 430/569 |
| 5,206,133 | 4/1993 | Bando | 430/567 |
| 5,254,456 | 10/1993 | Yamashita et al. | 430/603 |

FOREIGN PATENT DOCUMENTS

| | | |
|---|---|---|
| 2169360 | 9/1973 | France . |
| 2824082 | 12/1982 | Germany . |

OTHER PUBLICATIONS

F Granzer et al, Progress in Basic Principles of Imaging Systems, Proceedings ICPS, 1986, pp. 73–79.
Research Disclosure, No. 181, May 1979, pp. 265–268.
Grant & Hackh's Chemical Dictionary, 5th Edition (1987) p. 398.

*Primary Examiner*—Janis L. Dote
*Attorney, Agent, or Firm*—Birch, Stewart, Kolasch & Birch

[57] ABSTRACT

A silver halide photographic light-sensitive material includes a support and at least one layer of silver halide emulsion formed on the support. The emulsion layer contains silver halide grains which have been subjected both to reduction sensitization while growing and to at least one chemical sensitization selected from the group consisting of gold sensitization, sulfur sensitization, and noble-metal sensitization. Each of the silver halide grains has at least 5 mol % of silver iodide on a surface thereof.

13 Claims, No Drawings

SILVER HALIDE PHOTOGRAPHIC PHOTOSENSITIVE MATERIAL

Matter enclosed in heavy brackets [ ] appears in the original patent but forms no part of this reissue specification; matter printed in italics indicates the additions made by reissue.

This application is a continuation of application Ser. No. 07/436,630 filed on Nov. 15, 1989, which is now abandoned.

BACKGROUND OF THE INVENTION

1. Field of the Invention

The present invention relates to photographic light-sensitive material, and more particularly to such a material which contains light-sensitive silver halide grains reduction-sensitized while being formed and each having a specified amount of silver iodide on its surface, and which has high sensitivity, and is low in fogging, and high in sensitivity of, particularly, spectrally sensitized regions.

2. Description of the Related Art

Basic properties required for a photographic silver halide emulsion are high sensitivity, low fog, and fine graininess.

In order to increase the sensitivity of an emulsion, (1) to increase the number of photons absorbed by a single grain; (2) to increase an efficiency of converting photoelectrons generated by light absorption into a silver cluster (latent image); and (3) to increase development activity for effectively utilizing the obtained latent image; are required. Increasing the grain size increases the number of photons absorbed by a single grain but degrades image quality. Increasing the development activity is an effective measure to increase the sensitivity. In the case of parallel development as color development, however, the graininess is generally degraded. In order to increase the sensitivity without graininess degradation, it is most preferable to increase the efficiency of converting photoelectrons into a latent image, i.e., increase a quantum sensitivity. In order to increase the quantum sensitivity, low-efficiency processes such as recombination and latent image dispersion must be minimized. It is known that a reduction sensitization which forms a small silver nucleus having no development activity inside, or on the surface of, a silver halide is effective to prevent recombination.

James et al. have found that the sensitivity can be increased with a lower fog level than that in normal reduction sensitization when kind of reduction sensitization, in which a coating film of an emulsion subjected to gold-plus-sulfur sensitization is vacuum-deaerated and then heat-treated in a hydrogen atmosphere, is performed. This sensitization method is well known as hydrogen sensitization and is effective as a lab-scale high sensitization means. The hydrogen sensitization is actually used in the field of astrograph.

The reduction sensitization has been studied for a long time. Carroll, Lowe et al., and Fallens et al. disclose that a tin compound, a polyamine compound, and a thiourea dioxide-based compound are effective as a reduction sensitizer in U.S. Pat. Nos. 2,487,850 and 2,512,925 and British Patent 789,823, respectively. Collier compares properties of silver nuclei formed by various reduction sensitization methods in "Photographic Science and Engineering", Vol. 23, P. 113

(1979). She used reduction sensitizations using dimethylamine borane, stannous chloride, hydrazine, high-pH ripening, and low-pAg ripening. Various methods of reduction sensitization are also disclosed in U.S. Pat. Nos. 2,518,698, 3,201,254, 3,411,917, 3,779,777, and 3,930,867. Selection of a reduction sensitizer, and also a method of using a reducing agent are disclosed in, for example, JP-B 57-33572, JP-B 58-1410, and JP-A 57-179835. (Note: "JP-A" means Published Unexamined Japanese Patent Application, whereas "JP-B" means Published Examined Japanese Patent Application.) Techniques of improving storage stability of an emulsion subjected to reduction sensitization are disclosed in JP-A-57-82831 and JP-A-60-178445. Regardless of a number of studies as described above, an increase in sensitivity is insufficient as compared with that obtained in hydrogen sensitization in which a light-sensitive material is treated with hydrogen gas in a vacuum. This is reported by Moisar et al. in "Journal of Imaging Science", Vol. 29. P. 233 (1985).

Some of the publications specified above set out lists of the reduction sensitizers hitherto known. Among these sensitizers is ascorbic acid. In the publications, however, compounds such as thiourea dioxide are specified as preferable reduction sensitizers. In fact, reduction sensitizations using thiourea dioxide, silver ripening, and hydrazine are performed in the examples described in the publications. This fact suggests that ascorbic acid has not been regarded as preferable reduction sensitizers. The other reduction sensitization method is disclosed in JP-57-179835.

To effectively utilize reduction sensitizations, the problem of storage stability of photosensitive materials must be solved. Techniques of improving the storage stability of a reduction-sensitized emulsion are disclosed in JP-A 57-82831 and JP-A 60-178445. These techniques, however, fail to provide sufficient storage stability.

Thus, there is also a demand to improve the storage stability of light-sensitive material which contains a reduction-sensitized emulsion.

The conventional techniques of reduction sensitization are insufficient to satisfy a recent demand for a photographic light-sensitive material with high sensitivity and high image quality. The hydrogen sensitization also has a drawback that a sensitizing effect is lost when a light-sensitive material is left in air after hydrogen sensitization. Therefore, it is difficult to utilize this sensitization method to prepare a photographic light-sensitive material for which no special apparatus can be used.

There is another problem related to the reduction sensitization. When color or spectral sensitization is performed, along with the reduction sensitization, the spectral sensitization reduce the increase of the sensitivity achieved by the reduction sensitization.

SUMMARY OF THE INVENTION

It is a first object of the present invention to provide a silver halide photographic light-sensitive material which is high in sensitivity, low in fogging, and high in sensitivity of, particularly, spectrally sensitized regions.

It is a second object of the invention to provide photographic light-sensitive material which is high in sensitivity, low in fogging, and is less liable to degrade by natural radiation.

These and other objects which will become apparent from the description to follow are attained according to the invention by a photographic light-sensitive material comprising a support and at least one layer of silver halide emulsion formed on the support, said layer containing light-sensitive silver halide grains subjected to reduction sensitization while growing, and also to at least on chemical sensitization selected from the group consisting of gold sensitization, sulfur sensitization, and noble-metal sensitization, and each having at least 5 mol% of silver iodide on its surface. The chemical sensitization can be performed at any time during the process of manufacturing the silver halide emulsion.

The reduction sensitization can be performed in the presence of at least one compound selected from the group consisting of the compounds represented by formulas [I], [II], and [III]:

$$[R—SIO_2S—M]\ R—SO_2S—M \quad \text{I}$$

$$R—SO_2S—R^1 \quad \text{II}$$

$$RSO_2S—Lm—SSO_2—R^2 \quad \text{III}$$

where R, $R^1$, and $R^2$ can be the same or different and are an aliphatic group, an aromatic group, or a heterocyclic group, M is a cation, L is a divalent linking group, m is 0 or 1, with the proviso that R, $R^1$, $R^2$, and L may be bonded together to form a ring, where appropreate, and/or in the present of a polymer having a repeating unit of a divalent group derived from at least one compound selected from the compounds of formulas [I], [II], and [III].

According to one embodiment of the invention, the layer of the silver halide emulsion contains silver halide grains which have been gold plus sulfur sensitized after the reduction sensitization.

According to a preferred embodiment of the invention, the reduction sensitization is performed by using at least one ascorbic acid compound. In this embodiment, it is desirable that the ascorbic acid compound be used in an amount of $5\times10^{-5}$ moles to $1\times10^{-1}$ moles per one mole of silver halide.

DETAILED DESCRIPTION OF THE PREFERRED EMBODIMENTS

The photographic light-sensitive material according to the present invention comprises at least one layer of silver halide emulsion formed on a support and containing specific silver halide grains. The silver halide grains contained in the emulsion layer are characterized by having been subjected to reduction sensitization while growing during the process of manufacturing the silver halide emulsion. The word "growing" is intended to mean to include the physical ripening of the silver halide grains and also the addition of water-soluble silver salt and water-soluble alkali halide (i.e. precipitation of silver halide). The growth of the silver halide grains can be interrupted, and the grains can then be reduction-sensitized, followed by further growth of the grains. For example, the addition of watersoluble silver salt and water-soluble alkali halide is stopped, the silver halide grains grown thus far are reduction-sensitized to a desired degree, and then the addition of the salt and the alkali is started again to grow the grains larger.

The reduction sensitization of the present invention can be effected by any one of the following methods: addition of a reduction sensitizer in a silver halide emulsion; so-called silver ripening in which precipitating or ripening is performed in a low-pAg condition at pAg of 1 to 7; and so-called high-pH ripening in which precipitating or ripening is performed in a high-pH condition at pH of 8 to 11. These methods can be used in a combination of two or more thereof.

The addition of a reduction sensitizer is preferable because the level of reduction sensitization can be precisely adjusted.

Known examples of the reduction sensitizer are stannous salt, amines and polyamines, a hydrazine derivative, formamidinesulfinic acid, a silane compound, and a borane compound. In the present invention, these known compounds can be used singly or in a combination of two or more thereof. Preferable reduction sensitizers are stannous chloride, thiourea dioxide, and dimethylamineborane. An addition amount of the reduction sensitizer depends on emulsion manufacturing condition and therefore must be selected in accordance with the conditions. A preferable addition amount falls within the range of $10^{-7}$ to $10^{-3}$ moles per mole of a silver halide.

The reduction sensitizer can be dissolved in water or a solvent, e.g., alcohols, glycols, ketones, esters, or amides and then added during grain formation. The reduction sensitizer is preferably added at any time during grain formation though it can be added in a reaction vessel beforehand. In addition, the reduction sensitizer can be added in an aqueous solution of a water-soluble silver salt or water-soluble alkali halide to perform grain precipitation by using the aqueous solution. Addition of a solution of the reduction sensitizer several times or continuous addition of it over a long time period during grain growth is also preferable.

Ascorbic acids and their derivatives (i.e., ascorbic acid compounds), which can be used in the invention, are:

(A-1) L-ascorbic acid
(A-2) Sodium L-ascorbic acid
(A-3) Potassium L-ascorbic acid
(A-4) DL-ascorbic acid
(A-5) Sodium D-ascorbic acid
(A-6) L-ascorbic acid-6-acetate
(A-7]L-ascorbic acid-6-palmitate
(A-8]L-ascorbic acid-6-benzoate
(A-9) L-ascorbic acid-6-diacetate
(A-10) L-ascorbic acid-5,6-0-isopropylidene According to the invention, an ascorbic acid compound mentioned above may be dispersed directly in the silver halide emulsion being prepared. Alternatively, the ascorbic acid compound may be dissolved in a solvent such as water, methanol, ethanol or a mixture thereof, thus forming a solution, and this solution is added to the silver halide emulsion being prepared.

It is desirable that the ascorbic acid compound be used in a amount greater than that of the conventional reduction sensitizer preferably added to silver halide emulsion. In this regard, JP-B 57-33572 teaches: "Usually, the amount of the reduction sensitizer does not exceed $0.75\times10^{-2}$ milli-equivalent weight ($8\times10^{-4}$ mol/Ag mol). In most cases, it serves the purpose to use 0.1 to 10 mg of the sensitizer per kilogram of silver nitrate (i.e., in terms of ascorbic acid, $10^{-7}$ to $10^{-5}$ mol/Ag mol)." (The values in parentheses are of the inventors hereof.) Also, U.S. Pat. No. 2,487,850 reads: "The amount in which a tin compound can be used as a reduction sensitizer is $1\times10^{-7}$ to $44\times10^{-6}$ mol." Further, according to JP-A 57-179835, it is advisable to use thiourea dioxide and stannous chloride in amounts of about 0.01 mg to about 2 mg and about 0.01 mg to about 3 mg, respectively, per mol of silver halide. The preferable amount of the ascorbic acid compound used in the present invention depends upon the grain size and halogen composition of the emulsion, and temperature, pH value, and pAg value of the silver halide emulsion preparation. Desirably, it falls within the range from $5\times10^{-5}$ mol to $1\times10^{-1}$ mol, per mol of silver halide. The more preferable amount varies from $1\times10^{-3}$ to $1\times10^{-2}$ mol, per mol of silver halide.

The ascorbic acid compound according to the invention can be added any time or step in the process of manufacturing the emulsion. It is particularly desirable that the compound be added while the silver halide grains are growing. Although the compound can be added into a reaction vessel beforehand, it should better be added timely while the silver halide grains are growing. Alternatively, the ascorbic acid compound can be added to the aqueous solution of water-soluble silver salt or water-soluble alkali halide, before the aqueous solution of silver salt and the aqueous solution of the alkali halide are added together to form silver halide grains. Further, a preferable method is to add a solution of the ascorbic acid compound several times, or continuously add the solution, over a long period of time.

The reduction sensitization with the ascorbic acid compound according to the invention is superior to the conventionally known reduction sensitization in sensitivity, fog and stability with time. It is sometimes preferable to combine such reduction sensitization with the other reduction sensitization.

The reduction sensitization methods which can be combined with the reduction sensitization by the ascorbic acid compound in this invention are: addition of a known reduction sensitizer to the silver halide emulsion; silver ripening in which silver halide is grown or ripened in a low-pAg condition at pAg of 1 to 7; and high-pH ripening in which silver halide is grown or ripened in a high-pH condition at pH of 8 to 11. Of these methods, the first is preferable because the level of reduction sensitization can be precisely adjusted in this method.

The ascorbic acid compounds used in the present invention are reduction sensitizers superior to the known ones such as stannous salt, amines, polyamines, hydrazine derivatives, formamidinesulfinic acid, silane compounds, and borate compound.

In addition to the reduction sensitization, the silver halide grains used in the present invention is subjected to chemical sensitization of sulfur sensitization, gold sensitization, and/or sensitization by a VIII-Group noble metal (e.g., Pd, Pt, [Id] *Ir*). Of the chemical sensitizations, gold sensitization and sulfur sensitization are preferred. More preferable is gold-plus-sulfur sensitization (hereinafter called "gold/sulfur sensitization"). It is desirable that gold/sulfur sensitization be performed after the reduction sensitization according to the present invention.

The compounds represented by formulas [I], [II], and [III]will be described in more detail below. When R, $R^1$, and $R^2$ each present an aliphatic group, it is a saturated or unsaturated, straight-chain, branched or cyclic aliphatic hydrocarbon group and is preferably alkyl having 1 to 22 carbon atoms or alkenyl or alkynyl having 2 to 22 carbon atoms. These groups can have a substituent group. Examples of the alkyl are methyl, ethyl, propyl, butyl, pentyl, hexyl, octyl, 2-ethylhexyl, decyl, dodecyl, hexadecyl, octadecyl, cyclohexyl, isopropyl, and t-butyl.

Examples of the alkenyl are allyl and butenyl.

Examples of the alkynyl are propargyl and butynyl.

When R, $R^1$, and $R^2$ are aromatic groups, they include aromatic group of single-ring or fused-ring and preferably has 6 to 20 carbon atoms. Examples of such an aromatic group are phenyl and naphthyl. These groups can have a substituent group.

When R, $R^1$, and $R^2$ are heterocyclic groups, they include a 3- to 15-membered ring having at least one element of nitrogen, oxygen, sulfur, selenium, and tellurium and at least one carbon atom, preferably, a 3-to 6-membered ring. Examples of the heterocyclic group are pyrrolidine, piperidine, pyridine, tetrahydrofurane, thiophene, oxazole, thiazole,, imidazole, benzothiazole, benzoxazole, benzimidazole, selenazole, benzoselenazole, tellurazole, triazole, benzotriazole, tetrazole, oxadiazole, and thiadiazole.

Examples of the substituent group on R, $R^1$, and $R^2$ are an alkyl group (e.g., methyl, ethyl, and hexyl), an alkoxy group e.g., methoxy, ethoxy, and octyloxy), an aryl group (e.g., phenyl, naphthyl, and tolyl), a hydroxyl group, a halogen atom (e.g., fluorine, chlorine, bromine, and iodine), an aryloxy group (e.g. phenoxy), an alkylthio group (e.g., methylthio and butylthio), an arylthio group (e.g. phenylthio), an acyl group (e.g. acetyl, propionyl, butyryl, and valeryl), a sulfonyl group (e.g. methylsulfonyl and phenylsulfonyl), an acylamino group (e.g., acetylamino and benzoylamino), a sulfonylamino group (e.g., methanesulfonylamino and benzenesulfonylamino), an acyloxy group (e.g., acetoxy and benzoxy), carboxyl, cyano, sulfo, amino, $-SO_2SM$, and $-SO_2R^1$.

A divalent linking group represented by L includes an atom or an atomic group containing at least one of C, N, S, and O. Examples of L are alkylene, alkenylene, alkynylene, arylene, —O—, —S—, —NH—, —CO—, and $-SO_2-$. These divalent group can be used singly or in a combination of two or more thereof.

Preferably L represent divalent aliphatic group or a divalent aromatic group. Examples of the divalent aliphatic group of L are $-CH_2)_n$ (n=1 to 12), $-CH_2-CH=CH-CH_2-$, [$-CH_2c=CCH_2-$,] $CH_2C\equiv CCH_2-$,

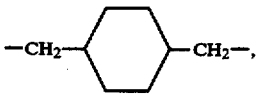

and xylylene. Examples of the divalent aromatic group of L are phenylene and naphthylene.

These substituent groups can have further substituent group above-mentioned.

M is preferably a metal ion or an organic cation. Examples of the metal ion are a lithium ion, a sodium ion, and a potassium ion. Examples of the organic cation are an ammonium ion (e.g., ammonium, tetramethylammonium, and tetrabutylammonium), a phosphonium ion (e.g. tetraphenylphosphonium), and a guanidil group.

A polymer having a divalent group derived from a compound represented by each of formulas [I] to [III] as a repeating unit can be used in the invention. Examples of the repeating unit are as follows:

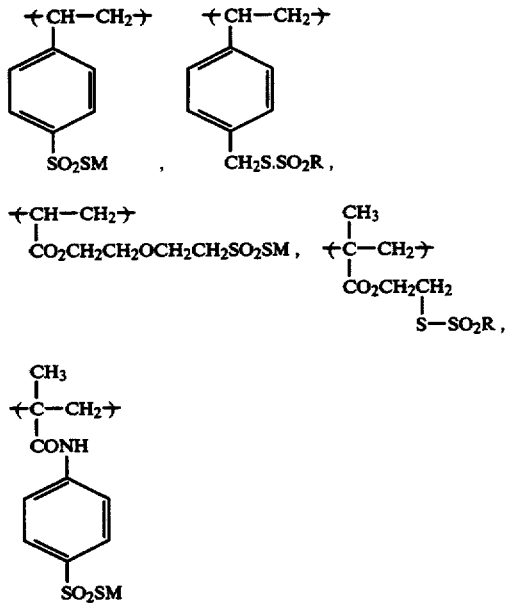

Each of the above polymers can be a homopolymer or a copolymer with another copolymerizable monomer.

Examples of a compound represented by formula [I], [II], or [III], and a polymer thereof are listed in Table A below. However, compounds are not limited to those in Table A.

Compounds represented by formula [I] can be easily synthesized by methods described or cited in JP-A-4-1019; British Patent 972,211; "Journal of Organic Chemistry", Vol. 53, PP. 396 (1988); and "Chemical Abstracts", Vol. 59, 9776e.

A preferable addition amount of a compound or a polymer thereof represented by formula [I], [II], or III] is $10^{-7}$ to $10^{-1}$ mol per mol of a silver halide. The addition amount is more preferably $10^{-6}$ to $10^{-2}$ and most preferably $10^{-5}$ to $10^{-3}$ mol/mol of Ag.

A conventional method of adding an additive in a photographic emulsion can be adopted to add compounds and polymers represented by formulas [I] to [III] in manufacturing process. For example, a water-soluble compound can be added in the form of an aqueous solution having an appropreate concentration, and a compound which is isoluble or hardly soluble in water can be dissolved in a suitable organic solvent such as alcohols, glycols, ketones, esters, and amides, which is miscible with water and does not adversely affect photographic properties, and then added as a solution.

A compound represented by formula [I], [I], or [III], or a polymer derived from the compound can be added any time during the growth of silver halide grains. Preferably, the compound or the polymer is added before or during the reduction sensitization. It is most preferable to add the compound or the polymer along with the reduction sensitizer.

The substance most preferable in the invention is a compound represented by formula [I], or a polymer derived from this compound.

It came as a surprise that the effect of the reduction sensitization as noted above was enhanced when each of the silver halide grains contained at least 5 mol% of silver iodide at its surface. The various known methods can be used to control the amount of silver iodide on each silver halide grain. Among these methods are: (a) to further add aqueous solution of water-soluble silver salt and aqueous halide solution containing water-soluble iodide to silver halide grains grown in the presence of protective colloid; (b) to add aqueous halide solution containing water-soluble iodide to silver halide grains grown in the presence of protective colloid; and (c) to add an iodide which is hard to dissolve, such as silver iodide or silver bromoiodide, to silver halide grains grown in the presence of protective colloid, and then to ripen the silver halide grains. Another method can be employed, in which silver halide grains containing iodide are subjected to physical ripening, thereby to distribute the iodide in the near-surface region of each grain.

When the silver halide grains according to the invention, each containing 5 to 30 mol% of silver iodide at their surface, are cubic grains or octahedral grains, it is desirable that the silver iodide be present on each grain as uniformly as is possible. In this case, each grain should preferably be entirely coated with a layer containing silver iodide. Also, preferable are dodecahedral grains having both (111) and (100) faces each, or grains having both major and side faces each (e.g., tabular grains), which are coated at specified faces only with a layer containing silver iodide. In other words, the silver halide grains which are partly coated with a layer containing silver iodide also fall within the scope of the present invention.

Preferably, the layer containing at least 5 mol% of silver iodide in its surface region is formed in the presence of a spectral sensitizer dye such as cyanine or merocyanine, or a stabilizer and an antifoggant such as mercapto compound or azole compound. Also is it desirable, in some cases, that the layer be formed in the presence of a solvent for silver halide, such as thiocyanic acid, thioether or ammonia.

The amount of silver iodide contained in the surface region of each of the silver halide grains used in the invention can be detected by various methods of analyzing elements contained in a surface region of an object, such as XPS (X-ray Photoelectron Spectroscopy), Auger Electron Spectroscopy, and ISS. Of these methods, the XPS surface analysis is easiest to perform and most reliable. The content of silver iodide in the silver halide grains according to the invention is of XPS value. The XPS surface analysis is said to detect the content of any element contained in a surface region having a thickness up to about 10 Å.

The principles of the XPS surface analysis, which can be employed to analyze the iodine contents in the near-surface regions of silver halide grains, are disclosed in Junichi Aihara, et al., "Electron Spectroscopy" in Kyoritsu Library 16, Kyoritsu Press, 1978.

In a standard XPS surface analysis, excitation X rays are applied from a Mg-Kc source to silver halide grains in a suitable sample form, and the intensities of the iodine (I) photoelectrons and the silver (Ag) photoelectrons (usually, I-$3d_{5/2}$, Ag-$3d_{5/2}$), all emitted from the silver halide grains, are measured, thereby determining the silver iodide content of the grains.

The iodine content of the silver halide grains can be determined by checking the ratio of the intensity of the iodine photoelectrons to that of the silver photoelectrons, against the calibration curve of the intensity ratio (I intensity/Ag intensity) prepared by using standard samples whose iodine contents are known. In the case of a silver halide emulsion, it is necessary to decompose the gelatin adsorbed to the surface of each silver halide grain with a protein-decomposing enzyme and then to remove the gelatin from the silver halide grain, before the emulsion is subjected to the XPS surface analysis.

As has been pointed out, the silver halide grains according to the present invention contains at least 5 mol% of silver iodide in their surface regions. This means that each grain contained in an emulsion is found to contain at least 5 mol% of silver iodide in its surface region when the emulsion is subjected to the XPS surface analysis. When an emulsion, which is obviously a mixture of two emulsions, is to be used, it is necessary to separate the mixture back into the two distinct emulsions by means of centrifugation or filtration, and then to perform the surface analysis on either emulsion. More preferably, the silver halide emulsion used in this invention is one which is found to contain 5 to 30 mol% of silver iodide when subjected to the standard XPS surface analysis.

The present invention is effective when the silver halide grains contain at least 5 mol% of silver iodide in their surface regions. More preferable silver halide grains are those containing at least 7.5 mol% of silver iodide in their surface regions. Still more preferable are silver halide grains which contain at 10 to 15 mol% of silver iodide in their surface regions.

Preferable surface silver halide, besides silver iodide, is silver bromide silver halide grains, and may contain 10 mol% or less of silver chloride.

The average silver halide composition of the entire silver halide grains, which have been subjected to the reduction sensitization according to this invention, is silver iodobromide or silver iodochlorobromide, containing 1 to 30 mol% of silver iodide. Preferably, the silver halide grains contain 7 to 20 mol% of silver iodide and may contain 10 mol% or less of silver chloride.

The emulsion layer incorporated in the photographic light-sensitive material according to the present invention can contain silver iodobromide grains and/or silver iodochlorobromide grains, not reduction-sensitized, either singly or in combination with the silver halide grains according to the invention. Preferable silver halide grains are silver iodobromide grains containing 30 mol% or less of silver iodide, or silver iodochlorobromide grains containing 30 mol% or less of silver iodide.

A silver halide grain which is used in the present invention is a regular crystal containing no twinned crystal faces, or that explained in Japan Photographic Society ed., "Silver Salt Photographs, Basis of Photographic Industries", (Corona publishing Co.,), P. 163, such as a single twinned crystal having one twinned crystal face, a parallel multiple twinned crystal having two or more parallel twinned crystal faces, or a non-parallel multiple twinned crystal having two or more non-parallel twinned crystal faces, which are selected in accordance with the purpose for which the silver halide grain is used.

In the case of a regular crystal, a cubic grain comprising (100) faces, an octahedral grain comprising (111) faces, and a dodecahedral grain comprising (110) faces disclosed in JP-B-55-42737 and JP-A-60-222842 can be used. In addition, a grain comprising (h11) represented by (211) faces, a grain comprising (hh1) represented by (331) faces, a grain comprising (hk0) represented by (210) faces, and a grain comprising (hk1) represented by (321) faces as reported in "Journal of Imaging Science", Vol. 30, P. 247, 1986 can be used in accordance with an application although a preparation method must be modified. A grain including two or more types of faces, e.g., a tetradecahedral grain comprising both (100) and (111) faces, a grain comprising both (100) and (110) faces, and a grain comprising both (111) and (110) faces can be used in accordance with an application.

The silver halide grains subjected to the reduction sensitization according to the invention or those which are used together therewith can be fine grains having a gr in size of 0.1 microns or less or a large grains having a projected area diameter of up to 10 microns (preferably, 0.5 to 2 microns). The emulsion can be a monodispersed emulsion having a narrow distribution or a polydispersed emulsion having a wide distribution.

A so-called monodisperse silver halide emulsion having a narrow size distribution, i.e., in which 80% or more (the number or weight of grains) of all grains fall within the range of ±30% of an average grain size can be used in the present invention. In order to obtain target gradation of a light-sensitive material, two or more types of monodisperse silver halide emulsions having different grain sizes can be coated in a single layer or overlapped in different layers in emulsion layers having substantially the same color sensitivity. Alternatively, two or more types of polydisperse silver halide emulsions or a combination of monodisperse and polydisperse emulsions can be mixed or overlapped.

The photographic emulsions for use in the present invention can be prepared using the methods described in, for example, P. Glafkides, "Chimie et Physique Photographique", Paul Montel, 1967; Duffin, "Photographic Emulsion Chemistry", Focal Press, 1966; and V.L. Zelikman et al., "Making and Coating the photographic Emulsion", Focal Press, 1964. Namely, the photographic emulsion can be prepared by, for example, an acid method, a neutralization method, and an ammonia method. Also, as a system for reacting a soluble silver salt and a soluble halide, a single mixing method, a double mixing method, or a combination thereof can be used. Also, a so-called back mixing method for forming silver halide grains in the presence of excessive silver ions can be used. As one system of the double mixing method, a so-called controlled double jet method, wherein the pAg in the liquid phase in which the silver halide is formed is kept at a constant value can be used. According to this method, a silver halide emulsion having a regular crystal form and almost uniform grain sizes is obtained.

The silver halide emulsion containing the abovedescribed regular silver halide grains can be obtained by controlling the pAg and pH during grain formation. More specifically, such a method is described in "Photographic Science and Engineering", Vol. 6, 159–165 (1962); "Journal of Photographic Science", Vol. 12, 242–251 (1964); U.S. Pat. No. 3,655,394, and British Patent 1,413,748.

A tabular grain having an aspect ratio of 3 or more can also be used in the present invention. The tabular grain can be easily prepared by methods described in, for example, Cleve, "Photography Theory and Practice", P. 131 (1930), Gutoff, "Photographic Science and Engineering" Vol. 14, PP. 248 to 257, (1970); and U.S. Pat. Nos. 4,434,226, 4,414,310, 4,433,048 and 4,439,520; and British Patent 2,112,157. When the tabular grain is used, sharpness, covering power and a color sensitizing efficiency of a sensitizing dye can be advantageously improved as described in detail in U.S. Pat. No. 4,434,226.

An emulsion having tabular grains is preferred in the present invention. Particularly preferable is an emulsion wherein tabular grains having an aspect ratio of 3 to 8 occupy 50% or more of the total projected surface area of the grains.

The grains of the emulsion can be those which have a uniform crystal structure, those which have each inner and outer structures of different halogen compositions, or those which each has a layered structure. These emulsion grains are disclosed in, for example, British Patent 1,027,146, U.S. Pat. Nos. 3,505,068 and 4,444,877, and JP-A 58-248469. The grains may be joined with a silver halide of a different composition by epitaxial junction, or with a compound other than silver halide such as silver rhodanide or lead oxide.

The silver halide emulsion of the present invention preferably has a distribution or structure of a halogen composition in its grain. A typical example is a core-shell type or double structured grain having different halogen compositions in the interior and surface layer of the grain as disclosed in, e.g., JP-B-43-13162, JP-A-61-215540, JP-A-60-222845, and JP-A-61-75337. In such a grain, the shape of a core portion is sometimes identical to or sometimes different from that of the entire grain with a shell. More specifically, while the core portion is cubic, the grain with a shell is sometimes cubic or sometimes octahedral. On the contrary, while the core portion is octahedral, the grain with a shell is sometimes cubic or sometimes octahedral. In addition, while the core portion is a clear regular grain, the grain with a shell is sometimes slightly deformed or sometimes does not have any definite shape. Furthermore, not a simple double structure but a triple structure as disclosed in JP-A-60-222844 or a multilayered structure of more layers can be formed, or a thin film of a silver halide having a different composition can be formed on the surface of a core-shell double structure grain.

In order to give a structure inside the grain, a grain having not only the above surrounding structure but a so-called junction structure can be made. Examples of such a grain are disclosed in, e.g., JP-A-59-133540, JP-A-58-108526, EP 199290A2, JP-B-58-24772, and JP-A-59-16254. A crystal to be bonded having a composition different from that of a host crystal can be produced and bonded to an edge, corner, or face portion of the host crystal. Such a junction crystal can be formed regardless of whether the host crystal has homogeneous halogen composition or a core-shell structure.

The junction structure can, of course, be made by a combination of silver halides. In addition, the junction structure can be made by combining a silver salt compound not having a rock salt structure, e.g., silver rhodanate or silver carbonate with a silver halide. A non-silver salt compound such as PbO can also be used as long as the junction structure can be made.

In a silver iodobromide grain having the above structure, e.g., in a core-shell type grain, preferably, the silver iodide content is high at a core portion and low at a shell portion, or vice versa. Similarly, in a grain having the junction structure, the silver iodide content may be high in a host crystal and relatively low in a junction crystal or vice versa.

In a grain having the above structure, a boundary portion between different halogen compositions may be clear, or unclear by the formation of a mixed crystal formed due to a composition difference. Alternatively, a continuous structural change may be positively made.

The silver halide emulsion for use in the present invention can be subjected to a treatment for rounding a grain as disclosed in, e.g., EP-0096727Bl and EP-0064412Bl or a treatment of modifying the surface of a grain as disclosed in DE-2306447C2 and JP-A-60-221320.

The silver halide emulsion for use in the present invention is preferably a surface latent image type. An internal latent image type emulsion, however, can be used by selecting a developing solution or development conditions as disclosed in JP-A-59-133542. In addition, a shallow internal latent image type emulsion covered with a thin shell can be used in accordance with an application.

A silver halide solvent can be effectively used to promote ripening. For example, in a known conventional method, an excessive amount of halogen ions are supplied in a reaction vessel in order to promote ripening. Therefore, it is apparent that ripening can be promoted by only supplying a silver halide solution into a reaction vessel. In addition, another ripening agent can be used. In this case, a total amount of these ripening agents can be mixed in a dispersion medium in the reaction vessel before a silver salt and a halide are added therein, or they can be added in the reaction vessel together with one or more halides, a silver salt or a deflocculant. Alternatively, the ripening agents can be added in separate steps together with a halide and a silver salt.

Examples of the ripening agent other than the halogen ion are ammonium, an amine compound and a thiocyanate such as an alkali metal thiocyanate, especially sodium or potassium thiocyanate and ammonium thiocyanate.

The silver halide grains used in the invention are subjected to not only reduction-sensitization, but also at least one of chemical sensitization selected from the group consisting of sulfur sensitization, gold sensitization, and noble-metal sensitization. The chemical sensitization or sensitizations are performed in any steps, typically grain formation step, during the process of manufacturing the silver halide emulsion. When to perform at least one chemical sensitization depends upon the composition, structure and shape of the emulsion grains and also upon the use of the emulsion. Typically, the chemical sensitization or sensitizations are performed at a grain growth stage after the reduction sensitization. It is possible to embed the chemical sensitization nucleus inside the grain or in the shallow portion from the surface of the grain, or to form the chemical sensitization nucleus on the surface of the grain. Although the present invention is effective in either instance, the chemical sensitization nucleus is most preferably formed in the near-surface region of each grain. In other words, the invention is more effective when a surface latent image type emulsion is used than when an internal latent image type emulsion is used.

As has been pointed out, sulfur sensitization, gold sensitization, and noble-metal sensitization are the chemical sensitizations which can be applied in the present invention, either singly or in combination. Chemical sensitization can be performed by using active gelatin as described in T.H. James, "The Theory of the Photographic Process", 4th ed., Macmillan, 1977, PP. 67 to 76. Alternatively, chemical sensitization can be performed at a pAg of 5 to 10, a pH of 5 to 8 and a temperature of 30° to 80° C. by using sulfur, selenium, tellurium, gold, platinum, palladium or irridium, or a combination of a plurality of these sensitizers as described in Research Disclosure Vol. 120, No. 12,008 (April, 1974), Research Disclosure Vol. 34, No. 13,452 (June, 1975), U.S. Pat. Nos. 2,642,361, 3,297,446, 3,772,031, 3,857,711, 3,901,714, 4,266,018, and 3,904,415, and British Patent 1,315,755. Chemical sensitization is optimally performed in the presence of a gold compound and a thiocyanate compound, a sulfur-containing compound described in U.S. Pat. Nos. 3,857,711, 4,266,018 and 4,054,457 or a sulfur-containing compound such as a hypo, thiourea compound and a rhodanine compound. Chemical sensitization can also be performed in the presence of a chemical sensitization aid. An example of the chemical sensitization aid is a compound known to suppress fogging and increase sensitivity in the chemical sensitization process, such as azaindene, azapyridazine, and azapyrimidine. Examples of a chemical sensitization aid modifier are described in U.S. Pat. Nos. 2,131,038, 3,411,914, 3,554,757, JP-A-58-126526 and G.F. Duffin, "Photographic Emulsion Chemistry", PP. 138 to 143.

The emulsion used in the present invention produces no problems when it is not only reduction-sensitized but also chemical-sensitized. It is practically difficult to apply both the reduction sensitization and the gold sensitization to the conventionally used emulsion, because of an increase in fogging. The emulsion used in the invention, however, exhibits good properties even if it is gold-sensitized, as well as reduction-sensitized. A preferable amount in which to use a gold sensitizer is $1\times10^{31\,4}$ to $1\times10^{-7}$ mol per mol of silver halide. More referable amount ranges from $1\times10^{-5}$ to $1\times10^{-7}$ mol per mol silver halide.

A preferable amount in which to use a sulfur sensitizer for sensitizing silver halide grains ranges from $1\times10^{-4}$ to $1\times10^{-7}$ mol per mol of silver halide. A more preferable amount of the sulfur sensitizer ranges from $1\times10^{-5}$ to $5\times10^{-7}$ mol per mol of silver halide.

When gold/sulfur sensitization is applied, the amount of the gold/sulfur sensitizers are used in the same amount described above, respectively.

The photographic emulsion of the present invention can contain various compounds in order to prevent fogging during manufacture, storage, or a photographic process of the light-sensitive material or to stabilize photographic properties. Examples of the compound known as an antifoggant or stabilizer are azoles, e.g., benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles (especially, 1-phenyl-5mercaptotetrazole); mercaptopyrimidines; mercaptotriadines; a thioketo compound such as oxadrinthione; azaindenes, e.g., triazaindenes, tetraazaindenes (especially, 4-hydroxy-substituted(1,3,3a,7)tetraazaindenes), and pentaazaindenes. Examples are described in U.S. Pat. Nos. 3,954,474 and 3,982,947 and JP-B-52-28660.

The photographic emulsion of the present invention is preferably spectrally sensitized by, e.g., methine dyes, in order to exert the effect of the invention. Examples of the dye are a cyanine dye, merocyanine dye, a composite cyanine dye, a composite merocyanine dye, a holopolar cyanine dye, a hemicyanine dye, a styryl dye, and a hemioxonol dye. Most effective dyes are those belonging to a cyanine dye, a merocyanine dye, and a composite merocyanine dye. In these dyes, any nucleus normally used as a basic heterocyclic nucleus in cyanine dyes can be used. Examples of the nucleus are a pyrroline nucleus, an oxazoline nucleus, a thiozoline nucleus, a pyrrole nucleus, an oxazole nucleus, a thiazole nucleus, a selenazole nucleus, an imidazole nucleus, a tetrazole nucleus, and a pyridine nucleus; a nucleus having an alicyclic hydrocarbon ring fused to each of the above nuclei; and a nucleus having an aromatic hydrocarbon ring fused to each of the above nuclei, e.g., an indolenine nucleus, a benzindolenine nucleus, an indole nucleus, a benzoxadole nucleus, a naphthooxazole nucleus, a benzothiazole nucleus, a naphthothiazole nucleus, a benzoselenazole nucleus, a benzimidazole nucleus, and a quinoline nucleus. These nuclei can have a substituent group on its carbon atom.

For a merocyanine dye or composite merocyanine dye, a 5- or 6-membered heterocyclic nucleus, e.g., a pyrazoline-5-one nucleus, a thiohydantoin nucleus, a 2-thiooxazolidine-2,4-dione nucleus. a thiazolidine-2,4-dione nucleus, a rhodanine nucleus, and a thiobarbituric acid nucleus can be used as a nucleus having a ketomethylene structure.

These sensitizing dyes can be used singly or in a combination of two or more thereof. A combination of the sensitizing dyes is often used especially in order to perform supersensitization. Typical examples of the combination are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, 4,026,707, British Patents 1,344,281 and 1,507,803, JP-B-43-4936 and JP-B-53-12375, and JP-A-52-110618 and JP-A-52-109925.

The emulsion can contain, in addition to the sensitizing dye, a dye not having a spectral sensitizing effect or a substance substantially not absorbing visible light and having supersensitization.

The dye can be added in the emulsion at any timing conventionally known to be effective in emulsion preparation. Most ordinarily, the dye is added after completion of chemical sensitization and before coating. However, the dye can be added at the same time as a chemical sensitizer to simultaneously perform spectral sensitization and chemical sensitization as described in U.S. Pat. Nos. 3,628,969 and 4,225,666, added before chemical sensitization as described in JP-A-58-113928, or added before completion of silver halide grain precipitation to start spectral sensitization. In addition, as described in U.S. Pat. No. 4 225,666, the above compound can be separately added such that a portion of the compound is added before chemical sensitization and the remaining portion is added thereafter. That is, as described in U.S. Pat. No. 4,183,756, the compound can be added at any timing during silver halide grain formation.

An addition amount of the sensitizing dye can be $4\times10^{-6}$ to $8\times10^{-3}$ mol per mol of a silver halide. When a silver halide grains has a preferable size of 0.2 to 1.2 μm, an addition amount of about $5\times10^{-5}$ to $2\times10^{-3}$ mol is more effective.

The above various additives are used in the light-sensitive material of the present invention. In addition to the above additives, however, various additives can be used in accordance with applications.

These additives are described in Research Disclosures, Item 17643 (Dec. 1978) and Item 18716 (Nov. 1979) and they are summarized in the following table.

| Additives | RD No. 17643 | RD No. 18716 |
|---|---|---|
| 1. Chemical sensitizers | page 23 | page 648, right column |
| 2. Sensitivity increasing agents | | page 648, right column |
| 3. Spectral sensitizers, super sensitizers | pages 23–24 | page 648, right column to page 649, right column |
| 4. Brighteners | page 24 | |
| 5. Antifoggants and stabilizers | pages 24–25 | page 649, right column |
| 6. Light absorbent, filter dye, ultraviolet absorbents | pages 25–26 | page 649, right column to page 650, left column |
| 7. Stain preventing agents | page 25, right column | page 650, left to right columns |
| 8. Dye image stabilizer | page 25 | |
| 9. Hardening agents | page 26 | page 651, left column |
| 10. Binder | page 26 | page 651, left column |
| 11. Plasticizers, lubricants | page 27 | page 650, right column |
| 12. Coating aids, surface active agents | pages 26–27 | page 650, right column |
| 13. Antistatic agents | page 27 | page 650, right column |

In this invention, various color couplers can be used in the light-sensitive material. Specific examples of these couplers are described the patent references cited in above-described Research Disclosure, No. 17643, VII-C to G.

Preferred examples of a yellow coupler are described in, e.g., U.S. Pat. Nos. 3,933,501, 4,022,620, 4,326,024, and 4,401,752, JP-B-58-10739, and British Patents 1,425,020 and 1,476,760.

Preferred examples of a magenta coupler are 5-pyrazolone and pyrazoloazole compounds, and more preferably, compounds described in, e.g., U.S. Pat. Nos. 4,310,619 and 4,351,897, EP 73,636, U.S. Pat. Nos. 3,061,432 and 3,752,067, Research Disclosure No. 24220 (June 1984), JP-A-60-33552, Research Disclosure No. 24230 (June 1984), JP-A-60-43659, and U.S. Pat. Nos. 4,500,630 and 4,540,654.

Examples of a cyan coupler are phenol and naphthol couplers, and preferably, those described in, e.g., U.S. Pat. Nos. 4,052,212, 4,146,396, 4,228,233, 4,296,200, 2,369,929, 2.801,171, 2,772,162, 2,895,826, 3,772,002, 3,758,308, 4,334,011, and 4,327,173, West German Patent Application (OLS) No. 3,329,729, EP 121,365A, U.S. Pat. Nos. 3,446,622, 4,333,999, 4,451,559, and 4,427,767, and EP 161,626A.

Preferable examples of a colored coupler for correcting additional, undesirable absorption of colored dye are those described in Research Disclosure No. 17643, VII-G, U.S. Pat. No. 4,163,670, JP-B-57-39413, U.S. Pat. Nos. 4,004,929 and 4,138,258, and British Patent 1,146,368.

Preferable examples of a coupler capable of forming colored dyes having proper diffusibility are those described in U.S. Pat. No. 4,366,237, British Patent 2,125,570, EP 96,570, and West German Patent Application (OLS) No. 3,234,533.

Typical examples of a polymerized dye-forming coupler are described in U.S. Pat. Nos. 3,451,820, 4,080,211, and 4,367,282, and British Patent 2,102,173.

Couplers releasing a photographically useful residue upon coupling are also preferably used in the present invention. Preferable DIR couplers, i.e., couplers releasing a development inhibitor are described in the patents cited in the above-described Research Disclosure No. 17643, VII-F, JP-A-57-151944, JP-A-57-154234, JP-A-60-184243, and U.S. Pat. No. 4,248,962.

Preferable example of a coupler imagewise releasing a nucleating agent or a development accelerator upon development are those described in British Patent 2,097,140, 2,131,188, and JP-A-59-157638 and JP-A-59-170840.

Other examples of a coupler which can be used in the light-sensitive material of the present invention are composing couplers described in, e.g., U.S. Pat. No. 4,130,427; poly-equivalent couplers described in, e.g., U.S. Pat. Nos. 4,283,472, 4,338,393, and 4,310,618; DIR redox compound or DIR coupler described in e.g., JP-A-60-185950 and JP-A-62-24252; couplers releasing a dye which turns to a colored form after being released described in European Patent No. 173,302A; bleaching accelerator releasing couplers described in, e.g., R.D. Nos. 11449 and 24241 and JP-A-61-201247; and a ligand releasing coupler described in, e.g., U.S. Pat. No. 4,553,477.

The couplers for use in this invention can be used in the light-sensitive materials by various known dispersion methods.

Examples of a high-boiling solvent used in an oil-in-water dispersion method are described in, e.g., U.S. Pat. No. 2,322,027.

Examples of a high-boiling organic solvent to be used in the oil-in-water dispersion method and having a boiling point of 175° C. or more at normal pressure are phthalic esters (e.g., dibutylphthalate, dicyclohexylphthalate, di-2-ethylhexylphthalate), esters of phosphoric acid or phosphonic acid (e.g., triphenylphosphate, tricresylphosphate, 2-ethylhexyldiphenylphosphate, tricyclohexylphosphate, tri-2-ethylhexylphosphate), esters of benzoic acid (e.g., 2-ethylhexylbenzoate, dodecylbenzoate, and 2-ethylhexyl-p-hydroxybenzoate), amides (e.g., N,N-diethyldodecaneamide, N,N-diethyllaurylamide, and N-tetradecylpyrrolidone), alcohols or phenols (e.g., isostearylalcohol and 2,4di-tert-amylphenol), esters of aliphatic carboxylic acid (e.g., bis(2-ethylhexyl)sebacate, dioctylazelate, glyceroltributylate, isostearyllactate, and trioctylcitrate), an aniline - derivative (e.g., N,N-dibutyl-2-butoxy-5-tert-octylaniline), and hydrocarbons (e.g., paraffin, dodecylbenzene, and diisopropylnaphthalene). An organic solvent having a boiling point of about 30° C. or more, and preferably, 50° C. to about 160° C. can be used as an auxiliary solvent. Typical examples of the auxiliary solvent are ethyl acetate, butyl acetate, ethyl propionate, methylethylketone, cyclohexanone, 2-ethoxyethylacetate, and dimethylformamide.

Steps and effects of a latex dispersion method and examples of an loadable latex are described in U.S. Pat. No. 4,199,363, West German Patent Application (OLS) Nos. 2,541,274 and 2,541,230, and the like.

The present invention can be applied to various color light-sensitive materials. Typical examples of the material are a color negative film for a general purpose or a movie, a color reversal film for a slide or a television, color paper, a color positive film, and color reversal paper.

When the present invention is used as a material for color photographing, the present invention can be applied to light-sensitive materials having various structures and to light-sensitive materials having combinations of various layer structures and special color materials.

Typical examples are: light-sensitive materials, in which a coupling speed of a color coupler or diffusibility is combined with a layer structure, as disclosed in, e.g., JP-B-47-49031, JP-B-49-3843, JP-B-50-21248, JP-A-59-58147, JP-A-59-60437, JP-A-60-227256, JP-A-61-4043, JP-A-61-43743, and JP-A-61-42657; light sensitive materials, in which a same-color-sensitive layer is divided into two or more layers, as disclosed in JP-B-49-15495 and U.S. Patent 3843469; and light-sensitive materials, in which an arrangement of high-and low-sensitivity layers or layers having different color sensitivities is defined, as disclosed in JP-B-53-37017, JP-B-53-37018, JP-A-51-49027, JP-A-52-143016, JP-A-53-97424, JP-A-53-97831, JP-A-62-200350, and JP-A-59-177551.

Examples of a support suitable for use in this invention are described in the above-mentioned RD. No. 17643, page 28 and ibid., No. 18716, page 647, right column to page 648, left column.

The color photographic light-sensitive materials of this invention can be processed by the ordinary processes as described, for example, in above-described Research Disclosure, No. 17643, pages 28 to 29 and ibid., No. 18716, page 651, left column to right column.

A color developer used in developing of the light-sensitive material of the present invention is, preferably, an aqueous alkaline solution containing, as a main component, an aromatic primary amine-based color developing agent. As the color developing agent, although an aminophenol-based compound is effective, a p-phenylenediamine-based compound is preferably used. Typical examples of the p-phenylenediamine-based compound are 3-methyl-4-amino-N,N-diethylaniline, 3-methyl-4-amino-N-ethyl-N-$\beta$-hydroxyethylaniline, 3-methyl-4-amino-N-ethyl-N-$\beta$-methanesulfonamidoethylaniline, 3-methyl-4-amino-N-ethyl-N-$\beta$-methoxyethylaniline, and sulfates, hydrochlorides and p-toluenesulfonates thereof. These compounds can be used in a combination of two or more thereof in accordance with applications.

In general, the color developer contains a pH buffering agent such as a carbonate, a borate or a phosphate of an alkali metal, and a development restrainer or antifoggant such as a bromide, an iodide, a benzimidazole, a benzothiazole or a mercapto compound. If necessary, the color developer can also contain a preservative such as hydroxylamine, diethylhydroxylamine, a hydrazine sulfite, a phenylsemicarbazide, triethanolamine, a catechol sulfonic acid or a triethylenediamine(1,4-diazabicyclo[2,2,2]octane); an organic solvent such as ethyleneglycol or diethyleneglycol; a development accelerator such as benzylalcohol, polyethyleneglycol, a quaternary ammonium salt or an amine; a dye forming coupler; a competing coupler; a fogging agent such as sodium boron hydride; an auxiliary developing agent such as 1-phenyl-3-pyrazolidone; a viscosity imparting agent; and a chelating agent such as an aminopolycarboxylic acid, an aminopolyphosphonic acid, an alkylphosphonic acid or a phosphonocarboxylic acid. Examples of the chelating agent are ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N'N'-tetramethylenephosphonic acid and ethylenediamine-di(o-hydroxyphenylacetic acid), and salts thereof. In order to perform reversal development, generally, black-and-white development is performed and then color development is performed. For a black-and-white developer, well-known black-and-white developing agents, e.g., a dihydroxybenzene such as hydroquinone, a 3-pyrazolidone such as 1-phenyl-3-phrazolidone, and an aminophenol such as N-methyl-p-aminophenol can be used singly or in a combination of two or more thereof.

The pH of the color developer and the black-and-white developer is generally 9 to 12. Although a replenishment amount of the developer depends on a color photographic light-sensitive material to be processed, it is generally 3 iters or less per $m^2$ of the light-sensitive material. The replenishment amount can be decreased to be 500 ml or less by decreasing a bromide ion concentration in a replenishing solution. In the case of to decreasing the replenishment amount, a contact area of a processing tank with air is preferably decreased to prevent evaporation and oxidation of the solution upon contact with air. The replenishment amount can be also decreased by using a means capable of suppressing an accumulation amount of bromide ions in the developer.

A color development time is normally set between 2 to 5 minutes. The processing time, however, can be shortened by setting a high temperature and a high pH and using the color developing agent at a high concentration.

The photographic emulsion layer is generally subjected to bleaching after color development. The bleaching can be performed either simultaneously with fixing (bleach-fixing) or independently thereof. In addition, in order to increase a processing speed, bleach-fixing can be performed after bleaching. Also, processing can be performed in a bleach-fixing bath having two continuous tanks, fixing can be performed before bleach-fixing, or bleaching can be performed after bleach-fixing, in accordance with applications. Examples of the bleaching agent are a compound of a multivalent metal such as iron (III), cobalt (III), chromium (VI) and copper (II); a peroxide; a quinone; and a nitro compound. Typical examples of the bleaching agent are a ferricyanide; a dichromate; an organic complex salt of iron (III) or cobalt (III), e.g., a complex salt of an aminopolycarboxylic acid such as ethylenediaminetetraacetic acid, diethylenetriaminepentaacetic acid, cyclohexanediaminetetraacetic acid, methyliminodiacetic acid, and 1,3-diaminopropanetetraacetic acid, and glycoletherdiaminetetraacetic acid, or a complex salt of citric acid, tartaric acid or malic acid; a persulfate; a bromate; a permanganate; and a nitrobenzene. Of these compounds, an iron (III) complex salt of aminopolycarboxylic acid such as an iron (III) complex salt of ethylenediaminetetraacetic acid, and a persulfate are preferred because they can increase a processing speed and prevent an environmental contamination. Especially, the iron (III) complex salt of aminopolycarboxylic acid is effective in both the bleaching solutions and bleach-fixing solution. The pH of the bleaching solution or the bleach-fixing solution using the iron (III) complex salt of aminopolycarboxylic acid is normally 5.5 to 8. In order to increase the processing speed, however, processing can be performed at a lower pH.

A bleaching accelerator can be added to the bleaching solution, the bleach-fixing solution, and their prebath, if necessary. Examples of the effective bleaching accelerators are disclosed in U.S. Pat. No. 3,893,858 and some other publications. Also, the compounds disclosed in U.S. Pat. No. 4,552,834 are preferable as bleaching accelerators which can be used in the present invention. These bleaching accelerators can be added to the light-sensitive material. They are effective, especially in bleach-fixing of a color light-sensitive material for photographing. Examples of the fixing agent are a thiosulfate, a thiocyanate, a thioether-based compound, a thiourea and a large amount of an iodide. Of these compounds, a thiosulfate, especially, ammonium thiosulfate can be used in a widest range of applications. As a preservative of the bleach-fixing solution, a sulfite, a bisulfite or a carbonyl bisulfite adduct is preferred. The silver halide color photographic light-sensitive material of the present invention is normally subjected to washing and/or stabilizing steps after desilvering. An amount of water used in the washing step can be arbitrarily determined over a broad range depending on the properties of the light-sensitive material (e.g., a property determined by used substance such as a coupler), the application of the material, the temperature of the washing water, the number of water tanks (the number of stages), a replenishing scheme representing a counter or forward current, and other conditions. The relationship between the amount of water and the number of water tanks in a multi-stage counter-current scheme can be obtained by a method described in "Journal of the Society of Motion Picture and Television Engineers", Vol. 64, PP. 248–253 (May, 1955).

According to the above-described multi-stage counter-current scheme, the amount of water used for washing can be greatly decreased. Since washing water stays in the tanks for a long period of time, however, bacteria multiply and floating substances can be undesirably attached to the light-sensitive material. In order to solve this problem in the process of the color photographic light-sensitive material of the present invention, a method in which calcium and magnesium ions are decreased can be very effectively utilized, as described in Japanese Patent Application No 61-131632. In addition, a germicide such as an isothiazolone compound and cyabendazole described in JP-A-57-8542, a chlorine-based germicide such as chlorinated sodium isocyanurate, and germicides such as benzotriazole described in Hiroshi Horiguchi, "Chemistry of Antibacterial and Antifungal Agents", Eiseigijutsu-Kai ed., "Sterilization, Antibacterial, and Antifungal Techniques for Microorganisms", and Nippon Bokin Bokabi Gakkai ed., "Cyclopedia of Antibacterial and Antifungal Agents".

The pH of the water for washing the photographic light-sensitive material of the present invention is 4 to 9, and preferably, 5 to 8. The water temperature and the washing time can vary in accordance with the properties and applications of the light-sensitive material. Normally, the washing time is 20 seconds to 10 minutes at a temperature of 15° to 45° C., and preferably, 30 seconds to 5 minutes at 25° to 40° C. The light-sensitive material of the present invention can be processed directly by a stabilizing solution in place of washing. All known methods described in JP-A-57-8543, JP-A-58-14834 and JP-A-60-220345 can be used in such stabilizing processing.

Further, stabilizing is sometimes performed subsequently to washing. An example is a stabilizing bath containing formalin and a surface-active agent to be used as a final bath of the color light-sensitive material for photographing. Various chelating agents and antifungal agents can be added also in the stabilizing bath.

An overflow liquid produced upon replenishment of the washing and/or stabilizing solution can be reused in another step such as a desilvering step.

The silver halide color light-sensitive material of the present invention can contain a color developing agent in order to simplify processing and increase a processing speed.

The silver halide color light-sensitive material of the present invention can contain various 1-phenyl-3-pyrazolidones in order to accelerate color development, if necessary. Typical examples of the compound are described in JP-A-56-64339, JP-A-57-144547 and JP-A-58-115438.

Each processing solution in the present invention is used at a temperature of 10° to 50° C. Although a normal solution temperature is 33° to 38° C., processing can be accelerated at a higher temperature to shorten a processing time, or quality of image or stability of a processing solution can be improved at a lower temperature. In order to save silver for the light-sensitive material, processing using cobalt intensification or hydrogen peroxide intensification described in West German Patent No. 2,226,770 or U.S. Pat. No. 3,674,499 can be performed.

The silver halide light-sensitive material of the present invention can also be applied to heat development light-sensitive materials described in, e.g., U.S. Pat. No. 4,500,626, JP-A-60-133449, JP-A-59-218443, JP-A-61-238056, and EP 210,660A2.

The present invention will be described in more detail, by way of its examples.

EXAMPLE 1

Double twinned silver iodobromide crystal grains having an average iodine content of 20 mol%, an average sphere-equivalent diameter of 0.8 μm with a variation coefficient of the grain size of 19%, and an average aspect ratio of 5.0 were used as seed crystals, and several emulsions were formed in an aqueous gelatin solution by growing a shell on the grain for 30 minutes by means of a controlled double jet method wherein the potential of silver was maintained at −40 mV. The emulsions were formed in such conditions that they would have a core/shell ratio of 1 : 2, and the halogen solution formulations were controlled to have 0 to 7.5 mol% of iodine in terms of the iodine content in the shell. The formulations are shown in Table 1 below.

TABLE 1

| Formulation | Shell Iodine Content in Formulation | Surface AgI Content (XPS) |
|---|---|---|
| A | 0 | 2.5 mol % |
| B | 2.5 mol % | 5.7 mol % |
| C | 5.0 mol % | 7.5 mol % |
| D | 7.5 mol % | 9.6 mol % |
| E | KI solution corresponding to 2.5 mol % added to formulation C after the grain growth | 12.6 mol % |

During the shell formation, dimethylamineborane (DMAB) and thiosulfonic acid compound were added in those amounts and by those methods which are specified in Table 2 to effect reduction sensitization.

TABLE 2

1. Not reduction-sensitized
2. DMAB was added in the amount of $3 \times 10^{-6}$ mol, one minute after the start of the shell forming
3. Thiosulfonic acid 1-2 (Table A) was added in TABLE 2-continued

| | |
|---|---|
| | the amount of $3 \times 10^{-5}$ mol, one minute before the start of the shell forming, and DMAB was added in the amount specified in 2, one minute after the shell forming |
| 4. | DMAB was added to silver nitrate solution for growing the shell, and then this solution was added, as in 3 |

After the grains had been grown, each emulsion was subjected to a normal desalting/washing and redispersed at 40° C., maintaining pAg and pH at 8.9 and 6.3, respectively. Then, each emulsion was chemically sensitized to an optimal degree, with $6\times10^{-6}$ mol of sodium thiosulfate and $2\times10^{-6}$ mol of chloroauric acid, both per mol of silver halide. Before the chemical sensitization, an emulsion had been prepared which contained two spectral sensitizing dyes A and B represented by the following structural formulas, in the amounts of $2.5\times10^{-4}$ mol and $3.0\times10^{-4}$ mol, respectively, per mol of the silver halide contained in the emulsion.

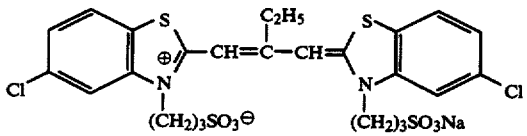

Dye A

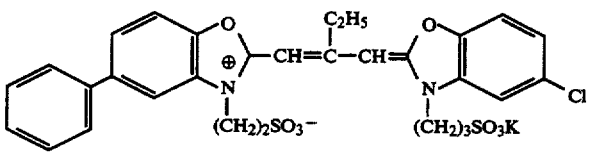

Dye B

A layer of the emulsion and a protective layer were coated, in the amounts listed in Table 3, on triacetyl cellulose film supports having undercoatings.

TABLE 3

| | |
|---|---|
| (1) Emulsion Layer | |
| Emulsion: Emulsions 1-18 shown in Table 4 | (silver: $1.7 \times 10^{-2}$ mol/m$^2$) |
| Coupler: | ($1.5 \times 10^{-3}$ mol/m$^2$) |

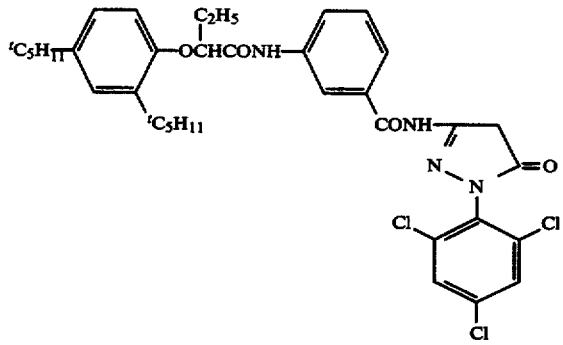

| | |
|---|---|
| Tricresylphosphate: | (1.10 g/m$^2$) |
| Gelatin: | (2.30 g/m$^2$) |
| (2) Protective Layer | |
| 2,4-dichlorotriazine-6-hydroxyl-s-triazine sodium salt: | (0.08 g/m$^2$) |
| Gelatin: | (1.80 g/m$^2$) |

These samples were subjected to sensitometry exposure, and the following color development was performed.

The processed samples were subjected to density measurement by using a green filter. The obtained photographic performance results are listed in Table 4.

Development was performed under the following conditions at a temperature of 38° C.

1. Color Development—2 min. 45 sec.
2. Bleaching—6min. 30 sec.
3. Washing—3min. 15 sec.
4. Fixing—6min. 30 sec.
5. Washing—3min. 15 sec.
6. Stabilizing—3min. 15 sec.

The compositions of processing solutions used in the above steps were as follows.

| | |
|---|---|
| Color Developer: | |
| Sodium Nitrilotriacetate | 1.4 g |
| Sodium Sulfite | 4.0 g |
| Sodium Carbonate | 30.0 g |
| Potassium Bromide | 1.4 g |
| Hydroxylamine Sulfate | 2.4 g |
| 4-(N-ethyl-N-β-hydroxyethylamino)-2-methyl-aniline Sulfate | 4.5 g |
| Water to make | 1 l |
| Bleaching Solution: | |
| Ammonium Bromide | 160.0 g |
| Ammonium Water (28% w/w) | 25.0 ml |
| Ferrie Sodium Ethylenediaminetetraacetate trihydrate | 130 g |
| Glacial Acetic Acid | 14 ml |
| Water to make | 1 l |
| Fixing Solution: | |
| Sodium Tetrapolyphosphate | 2.0 g |
| Sodium Sulfite | 4.0 g |
| Ammonium Thiosulfate (700 g/l) | 175.0 ml |
| Sodium Bisulfite | 4.6 g |
| Water to make | 1 l |
| Stabilizing Solution: | |
| Formalin | 8.0 ml |
| Water to make | 1 l |

In this case, normal wedge exposure was performed for one and 1/100 seconds.

The light source used was adjusted at a color temperature of 4,800° C. by means of a filter. Further, a blue filter (BPN42 manufactured by Fuji Photo Film Co., Ltd.) or a yellow filter was used. The sensitivities of the emulsions were compared at a point from fog by an optical density of 2.0. They are given in relative values, with the sensitivity of the sample using emulsion 1 being 100, the minus blue-sensitivities of the samples using emulsions 2 and 3 being 100. Table 4 shows the properties of the samples which had been exposed to light for 1/100 second.

TABLE 4

| Emulsion | Formulation | R.S. | Dye | Fog | B.S. | MBS | Remarks |
|---|---|---|---|---|---|---|---|
| 1 | A | 1 | None | 0.15 | 100 | — | Comp. Ex. |
| 2 | A | 1 | A | 0.18 | 63 | 100 | Comp. Ex. |
| 3 | A | 1 | B | 0.23 | 70 | 100 | Comp. Ex. |
| 4 | A | 3 | None | 0.16 | 125 | — | Comp. Ex. |
| 5 | A | 3 | A | 0.12 | 75 | 120 | Comp. Ex. |
| 6 | A | 3 | B | 0.25 | 80 | 115 | Comp. Ex. |
| 7 | A | 2 | A | 0.26 | 70 | 110 | Comp. Ex. |
| 8 | C | 1 | None | 0.13 | 100 | — | Comp. Ex. |
| 9 | C | 1 | A | 0.15 | 50 | 80 | Comp. Ex. |
| 10 | C | 1 | B | 0.16 | 56 | 80 | Comp. Ex. |
| 11 | C | 3 | None | 0.15 | 145 | — | Invention |
| 12 | C | 3 | A | 0.18 | 90 | 143 | Invention |
| 13 | C | 3 | B | 0.19 | 103 | 147 | Invention |
| 14 | C | 2 | A | 0.20 | 80 | 127 | Invention |
| 15 | C | 4 | A | 0.18 | 95 | 150 | Invention |
| 16 | B | 3 | A | 0.17 | 83 | 132 | Invention |
| 17 | D | 3 | A | 0.17 | 95 | 150 | Invention |
| 18 | E | 3 | A | 0.16 | 97 | 154 | Invention |

Note:
In Table 4, S.R. is reduction sensitization, B.S. is blue-sensitivity, and MBS is minus blue-sensitivity.

Since Emulsions 2 and 9 were not reduction-sensitized and contained spectral sensitizing dye A, they can indicate the influence of the surface AgI content when the reduction sensitization was not performed. When the surface AgI content is changed from 2.5 mol% to 7.5 mol%, both the blue-sensitivity and the minus blue-sensitivity decrease.

By contrast, Emulsions 5 and 12 were subjected to reduction sensitization, and contained spectral sensitizing dye A. As is apparent from Table 4, in the case of these emulsions which has been reduction-sensitized, when the surface AgI content is changed from 2.5 mol% to 7.5 mol%, both the blue-sensitivity and the negative blue-sensitivity increase.

EXAMPLE 2

The following dyes were added to chemically sensitized Emulsions 1, 4, 8, and 11 prepared in Example 1, thus forming red-sensitive, green-sensitive, and blue-sensitive emulsions:

II

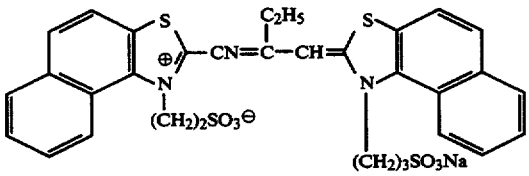

III

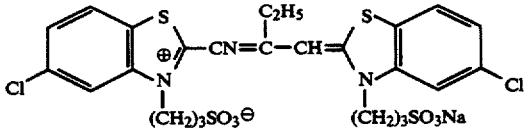

IV

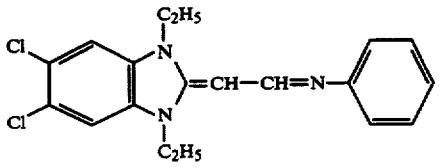

V

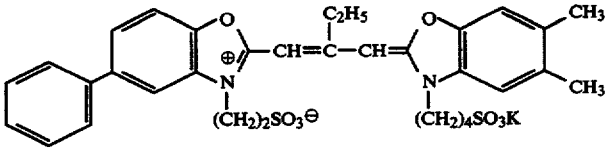

VI

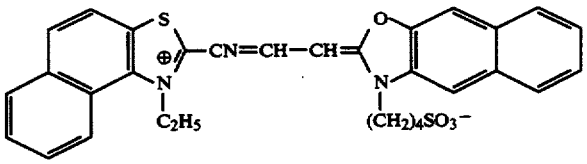

VII

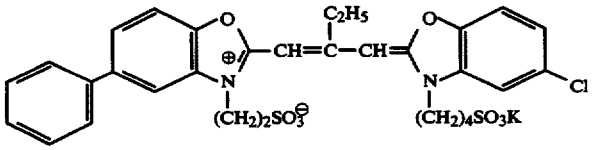

-continued

VIII

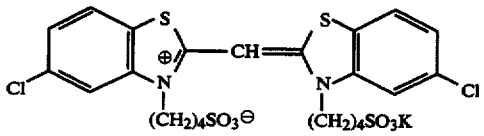

IX

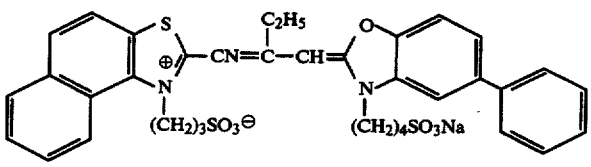

Dye Group 1 (Red-Sensitive Dyes)

Sensitizing Dye IX—$5.4\times10^{-5}$ mol/mol of Ag
Sensitizing Dye II—$1.4\times10^{-5}$ mol/mol of Ag
Sensitizing Dye III—$2.4\times10^{-4}$ mol/mol of Ag
Sensitizing Dye IV—$3.1\times10^{-5}$ mol/mol of Ag Dye Group 2 (Green-Sensitive Dyes)

Sensitizing Dye V—$3.5\times10^{-5}$ mol/mol of Ag
Sensitizing Dye VI—$8.0\times10^{-5}$ mol/mol of Ag
Sensitizing Dye VII—$3.0\times10^{-4}$ mol/mol of Ag Dye Group 3 (Blue-Sensitive Dyes)

Sensitizing Dye VIII—$2.2\times10^{-4}$ mol/mol of Ag

A plurality of supports made of triacetylcellulose film were prepared, which had been undercoated. The red-sensitive, green-sensitive, and blue-sensitive emulsions were coated on these supports. Layers of the following compositions were formed on each support, thereby preparing a sample 201 which was a multi-layer, color light-sensitive material.

Compositions of the Light-Sensitive Layers

The numerical values specified below in relation to the respective components indicate amounts coated, in the unit of g/m². As for silver halide, the amount coated is specified as an amount of silver. The amount of each sensitizing dye is represented in terms of mol per mol of the silver halide contained in the same layer.

| Sample 201 | | |
|---|---|---|
| Layer 1: Antihalation Layer | | |
| Black Colloidal Silver | silver | 0.18 |
| Gelatin | | 1.40 |
| Layer 2: Interlayer | | |
| 2,5-di-t-pentadecylhydroquinone | | 0.18 |
| EX-1 | | 0.07 |
| EX-3 | | 0.02 |
| EX-12 | | 0.002 |
| U-1 | | 0.06 |
| U-2 | | 0.08 |
| U-3 | | 0.10 |
| HBS-1 | | 0.10 |
| HBS-2 | | 0.02 |
| Gelatin | | 1.04 |
| Layer 3: 1st Red-Sensitive Emulsion Layer | | |
| Monodisperse Silver Iodobromide Emulsion (silver iodide = 6 mol %, average grain size = 0.6 μm, variation coefficient of grain size = 0.15) | | 0.55 |
| | silver | |
| Sensitizing Dye I | | $6.9\times10^{-5}$ |
| Sensitizing Dye II | | $1.8\times10^{-5}$ |
| Sensitizing Dye III | | $3.1\times10^{-4}$ |
| Sensitizing dye IV | | $4.0\times10^{-5}$ |
| EX-2 | | 0.350 |
| HBS-1 | | 0.005 |
| EX-10 | | 0.020 |
| Gelatin | | 1.20 |
| Layer 4: 2nd Red-Sensitive Emulsion Layer | | |
| Tabular Silver Iodobromide Emulsion (silver iodide = 10 mol %, average grain size = 0.7 μm, average aspect ratio = 5.5, average thickness = 0.2 μm) | | 1.0 |
| | silver | |
| Sensitizing Dye I | | $5.1\times10^{-5}$ |
| Sensitizing Dye II | | $1.4\times10^{-5}$ |
| Sensitizing Dye III | | $2.3\times10^{-4}$ |
| Sensitizing Dye IV | | $3.0\times10^{-5}$ |
| EX-2 | | 0.400 |
| EX-3 | | 0.050 |
| EX-10 | | 0.015 |
| Gelatin | | 1.30 |
| Layer 5: 3rd Red-Sensitive Emulsion Layer | | |
| Silver Iodobromide Emulsion I | | 1.60 |
| | silver | |
| EX-3 | | 0.240 |
| EX-4 | | 0.120 |
| HBS-1 | | 0.22 |
| HBS-2 | | 0.10 |
| Gelatin | | 1.63 |
| Layer 6: Interlayer | | |
| EX-5 | | 0.040 |
| HBS-1 | | 0.020 |
| Gelatin | | 0.80 |
| Layer 7: 1st Green-Sensitive Emulsion Layer | | |
| Tabular Silver Iodobromide Emulsion (silver iodide = 6 mol %, average grain size = 0.6 μm, average aspect ratio = 6.0, average thickness = 0.15 μm) | | 0.40 |
| | silver | |
| Sensitizing Dye V | | $3.0\times10^{-5}$ |
| Sensitizing Dye VI | | $1.0\times10^{-4}$ |
| Sensitizing Dye VII | | $3.8\times10^{-4}$ |
| EX-6 | | 0.260 |
| EX-1 | | 0.021 |
| EX-7 | | 0.030 |
| EX-8 | | 0.025 |
| HBS-1 | | 0.100 |
| HBS-4 | | 0.010 |
| Gelatin | | 0.75 |
| Layer 8: 2nd Green-Sensitive Emulsion Layer | | |
| Monodisperse Silver Iodobromide Emulsion (silver iodide = 9 mol %, average grain size = 0.7 μm, variation coefficient of grain size = 0.18) | | 0.80 |
| | silver | |
| Sensitizing Dye V | | $2.1\times10^{-5}$ |
| Sensitizing Dye VI | | $7.0\times10^{-5}$ |
| Sensitizing Dye VII | | $2.6\times10^{-4}$ |
| EX-6 | | 0.180 |
| EX-8 | | 0.010 |
| EX-1 | | 0.008 |
| EX-7 | | 0.012 |
| HBS-1 | | 0.160 |
| HBS-4 | | 0.008 |
| Gelatin | | 1.10 |
| Layer 9: 3rd Green-Sensitive Emulsion Layer | | |
| Silver Iodobromide Emulsion II | silver | 1.2 |
| EX-6 | | 0.065 |
| EX-11 | | 0.030 |
| EX-1 | | 0.025 |

-continued

| Sample 201 | | |
|---|---|---|
| HBS-1 | | 0.25 |
| HBS-2 | | 0.10 |
| Gelatin | | 1.74 |
| Layer 10: Yellow Filter Layer | | |
| Yellow Colloidal Silver | silver | 0.05 |
| EX-5 | | 0.08 |
| HBS-3 | | 0.03 |
| Gelatin | | 0.95 |
| Layer 11: 1st Blue-Sensitive Emulsion Layer | | |
| Tabular Silver Iodobromide Emulsion (silver iodide = 6 mol %, average grain size = 0.6 μm, average aspect ratio = 5.7, average thickness = 0.15 μm) | silver | 0.24 |
| Sensitizing Dye VIII | | $3.5 \times 10^{-4}$ |
| EX-9 | | 0.85 |
| EX-8 | | 0.12 |
| HBS-1 | | 0.28 |
| Gelatin | | 1.28 |
| Layer 12: 2nd Blue-Sensitive Emulsion Layer | | |
| Monodisperse Silver Iodobromide Emulsion (silver iodide = 10 mol %, average grain size = 0.8 μm, variation coefficient of grain size = 0.16) | silver | 0.45 |
| Sensitizing Dye VIII | | $2.1 \times 10^{-4}$ |
| EX-9 | | 0.20 |
| EX-10 | | 0.015 |
| HBS-1 | | 0.03 |
| Gelatin | | 0.46 |
| Layer 13: 3rd Blue-Sensitive Emulsion Layer | | |
| Silver Iodobromide Emulsion III | silver | 0.77 |
| EX-9 | | 0.20 |
| HBS-1 | | 0.07 |
| Gelatin | | 0.69 |
| Layer 14: 1st Protective Layer | | |
| Silver Iodobromide Emulsion (silver iodide = 1 mol %, average grain size = 0.07 μm) | silver | 0.5 |
| U-4 | | 0.11 |
| U-5 | | 0.17 |
| HBS-1 | | 0.90 |
| Gelatin | | 1.00 |
| Layer 15: 2nd Protective Layer | | |
| Polymethylacrylate Grains (grain size = about 1.5 μm) | | 0.54 |
| S-1 | | 0.15 |
| S-2 | | 0.05 |
| Gelatin | | 0.72 |

In addition to the above components, a gelatin hardener H-1 and/or a surfactant were added to each layer. Names or chemical structures of the compounds used in the sample 201 are listed in Table B to be presented later.

Samples 202 to 205 were prepared following the same procedures as for the sample 201 except that the silver iodobromide emulsion I in the layer 5, the silver iodobromide emulsion II in the layer 9, and the silver iodobromide emulsion III in the layer 13 were changed.

These samples were subjected to sensitometry exposure to perform the following color development.

The processed samples were subjected to density measurement by using red, green, and blue filters. The obtained results are shown in Table 5.

The results of photographic performance are represented by relative sensitivities of the red-, green-, and blue-sensitive layers assuming that the sensitivity of the sample 201 is 100. Processing Method The color development process was performed at 38° C. in accordance with the following process steps.

Color Development—3 min. 15 sec.
Bleaching—6min. 30 sec.
Washing—2 min. 10 sec.
Fixing—4 min. 20 sec.
Washing—3 min. 15 sec.
Stabilization—1 min. 05 sec.

The processing solution compositions used in the respective steps were as follows.

| | |
|---|---|
| Color Developing Solution | |
| Diethylenetriaminepentaacetic Acid | 1.0 g |
| 1-hydroxyethylidene-1,1-diphosphonic acid | 2.0 g |
| Sodium Sulfite | 4.0 g |
| Potassium Carbonate | 30.0 g |
| Potassium Bromide | 1.4 g |
| Potassium Iodide | 1.3 mg |
| Hydroxyamine Sulfate | 2.4 g |
| 4-(N-ethyl-N-β-hydroxyethylamino)-2-methylanilinesulfate | 4.5 g |
| Water to make | 1.0 l |
| pH | 10.0 |
| Bleaching Solution | |
| Ferric Ammonium Ethylenediaminetetraacetate | 100.0 g |
| Disodium Ethylenediaminetetraacetate | 10.0 g |
| Ammonium Bromide | 150.0 g |
| Ammonium Nitrate | 10.0 g |
| Water to make | 1.0 l |
| pH | 6.0 |
| Fixing Solution | |
| Disodium Ethylenediaminetetraacetate | 1.0 g |
| Sodium Sulfite | 4.0 g |
| Ammonium Thiosulfate Aqueous Solution (70%) | 175.0 ml |
| Sodium Bisulfite | 4.6 g |
| Water to make | 1.0 l |
| pH | 6.6 |
| Stabilizing Solution | |
| Formalin (40%) | 2.0 ml |
| Polyoxyethylene-p-monononylphenylether (average polymerization degree = 10) | 0.3 g |
| Water to make | 1.0 l |

TABLE 5

| Sample No. | Layer 5 Silver Iodobromide Emulsion I | Layer 9 Silver Iodobromide Emulsion II | Layer 13 Silver Iodobromide Emulsion III | Red-Sensitive Layer | | Green-Sensitive Layer | | Blue-Sensitive Layer | |
|---|---|---|---|---|---|---|---|---|---|
| | | | | Sensitivity | Fog | Sensitivity | Fog | Sensitivity | Fog |
| 201 (Comparative Example) | Em-1 | Em-1 | Em-1 | 100 | 0.15 | 100 | 0.16 | 100 | 0.18 |
| 202 (Comparative Example) | Em-4 | Em-4 | Em-4 | 110 | 0.17 | 112 | 0.18 | 114 | 0.20 |
| 203 | Em-8 | Em-8 | Em-8 | 85 | 0.14 | 85 | 0.15 | 100 | 0.16 |

TABLE 5-continued

| Sample No. | Layer 5 Silver Iodobromide Emulsion I | Layer 9 Silver Iodobromide Emulsion II | Layer 13 Silver Iodobromide Emulsion III | Red-Sensitive Layer | | Green-Sensitive Layer | | Blue-Sensitive Layer | |
|---|---|---|---|---|---|---|---|---|---|
| | | | | Sensitivity | Fog | Sensitivity | Fog | Sensitivity | Fog |
| (Comparative Example) 204 (Present Invention) | Em-11 | Em-11 | Em-11 | 130 | 0.15 | 138 | 0.16 | 135 | 0.18 |

As is apparent from Table 5, in the emulsion of the present invention, an effect of increasing the sensitivity with almost no increase in fog is shown.

EXAMPLE 3

Double twinned silver iodobromide crystal grains having an average iodine content of 20 mol%, an average sphere-equivalent diameter of 0.8 μm with a variation coefficient of the grain size of 19%, and an average aspect ratio of 5.0 were used as seed crystals, and emulsions were formed in an aqueous gelatin solution by forming a shell on each grain for 30 minutes by means of a controlled double jet method wherein the potential of silver halide was maintained at −40 mV. The emulsions were formed in such conditions that they would have a core/shell ratio of 1:2, and the halogen solution formulations were controlled to have 0 to 5.0 mol% of iodine in terms of the iodide content in the shell in formulations.

One minute after the start of the forming of the shell, L-ascorbic acid was added to some of the emulsions, and both L-ascorbic acid and thiosulfonic acid compound 1-2 (Table A) were added to some other emulsions. Further, stannous chloride and thiourea dioxide, used as comparative reduction sensitizers, were added to some other emulsions.

The formulations for emulsions 31–40 are shown in Table 6:

Table 6

| Emulsion | Shell Iodine Content in Formulation | Surface Iodine Content (XPS) | Sensitizer, Amount Added (per AgI mol) | Thiosulfonic-Acid Compound Added (per AgI mol) | Remarks |
|---|---|---|---|---|---|
| Em-31 | 0 mol % | 2.5 mol % | — | — | Comparative Example |
| Em-32 | 0 mol % | 2.5 mol % | L-Ascorbic Acid $2 \times 10^{-3}$ mol | 1-2 3 $\times 10^{-5}$ mol | Comparative Example |
| Em-33 | 2.5 mol % | 5.7 mol % | — | — | Comparative Example |
| Em-34 | 2.5 mol % | 5.7 mol % | L-Ascorbic Acid $2 \times 10^{-3}$ mol | 1-2 3 $10^{-5}$ mol | Invention |
| Em-35 | 5.0 mol % | 7.5 mol % | — | — | Comparative Example |
| Em-36 | 5.0 mol % | 7.5 mol % | — | 1-2 3 $\times 10^{-5}$ mol | Comparative Example |
| Em-37 | 5.0 mol % | 7.5 mol % | Stonuous Chloride $3 \times 10^{-6}$ mol | 1-2 3 $\times 10^{-5}$ mol | Invention |
| Em-38 | 5.0 mol % | 7.5 mol % | Thiouaea Llioxide $3 \times 10^{-6}$ mol | 1-2 3 $\times 10^{-5}$ mol | Invention |
| Em-39 | 5.0 mol % | 7.5 mol % | L-Ascorbic Acid $2 \times 10^{-3}$ mol | — | Invention |
| Em-40 | 5.0 mol % | 7.5 mol % | L-Ascorbic Acid $2 \times 10^{-6}$ mol | 1-2 3 $\times 10^{-5}$ mol | Invention |

After the grains had been grown, each emulsion was subjected to a normal desalting/washing and redispersed at 40° C., while pAg and pH were maintained at 8.9 and 6.3, respectively. Then, each emulsion was chemically sensitized to an optimal degree, with $6\times10^{-6}$ mol of sodium thiosulfate and $2\times10^{-6}$ mol of chloroauric acid, both per mol of silver halide. Before this chemical sensitization, an emulsion had been prepared which contained spectral sensitizing dyes A or B represented by the following structural formula, in the amounts of $2.5 \times10^{-4}$ mol and $3.0\times10^{-4}$ mol, respectively, per mol of silver halide.

Dye A

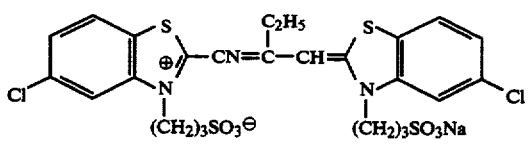

-continued

Dye B

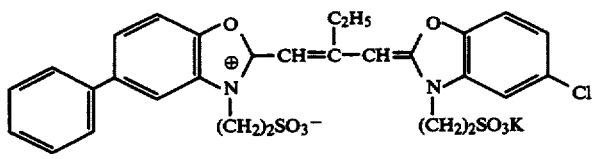

A layer of the emulsion and a protective layer were coated, in the amounts shown in Table 7, on triacetylcellulose film supports having undercoatings.

TABLE 7

| | |
|---|---|
| (1) Emulsion Layer | |
| Emulsion: Emulsions shown in Tables 8 and 9 | (silver: 1.7 × $10^{-2}$ mol/m$^2$) |
| Coupler: | (1.5 × $10^{-3}$ mol/m$^2$) |

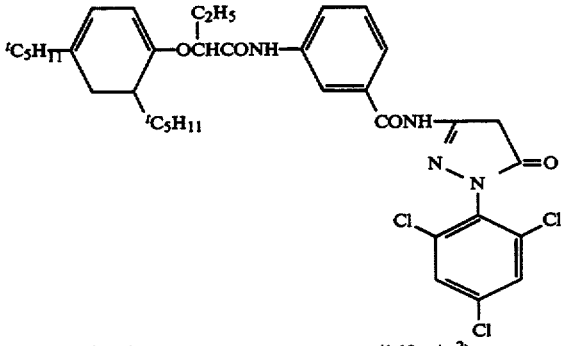

| | |
|---|---|
| Tricresylphosphate: | (1.10 g/m$^2$) |
| Gelatin: | (2.30 g/m$^2$) |
| (2) Protective Layer | |
| 2,4-dichlorotriazine-6-hydroxyl-s-triazine sodium salt: | (0.08 g/m$^2$) |
| Gelatin: | (1.80 g/m$^2$) |

These samples were subjected to sentimetry exposure, and the following color development was performed.

The densities of the processed samples were measured by using a green filter. The development was carried out under the following conditions at 38° C.:

1. Color Development—2 min. 45 sec.
2. Bleaching—6 min. 30 sec.
3. Washing—3 min. 15 sec.
4. Fixing—6 min. 30 sec.
5. Washing—3 min. 15 sec.
6. Stabilizing—3 min. 15 sec.

The compositions of the processing solutions used were as follows:

| | |
|---|---|
| Color Developer | |
| Sodium nitrilotriacetate | 1.4 g |
| Sodium sulfite | 4.0 g |
| Sodium carbonate | 30.0 g |
| Potassium bromide | 1.4 g |
| Hydroxylamine sulfate | 2.4 g |
| 4-(N-ethyl-N-β-hydrooxyethyl-amino)-2-methyl-aniline sulfate | 4.5 g |
| Water to make | 1 l |
| Bleaching Solution | |
| Ammonium bromide | 160.0 g |
| Aqueous ammonia (28% w/w) | 25.0 ml |
| Ferric Sodium ethylenediamine-tetraacetate trihydrate | 130 g |
| Glacial acetic acid | 14 ml |
| Water to make | 1 l |
| Fixing Solution | |
| Sodium tetrapolyphosphate | 2.0 g |
| Sodium sulfite | 4.0 g |

-continued

| | |
|---|---|
| Ammonium thiosulfate (700 g/l) | 175.0 ml |
| Sodium bisulfite | 4.6 g |
| Water to make | 1 l |
| Stabilizing solution | |
| Formalin | 8.0 ml |
| Water to make | 1 l |

Spectral sensitizing dye A was added to emulsions 31 to 40, whereby these emulsions were then chemically sensitized. The sensitized emulsions exhibited the photographing characteristics shown in Table 8. The emulsions had been exposed to light through a yellow filter for 1/100 sec. The sensitivities were measured at a point from fog by an optical density of 0.2. Table 8 shows not only the photographing characteristics which the emulsions exhibited immediately after they had been coated on supports, but also their photographing characteristics measured after the samples had been left to stand at 23° C. at relative humidity of 55% for two months.

TABLE 8

| | Photographing characteristics Right After Coating | | Photographing characteristics 2 Months After coating | |
|---|---|---|---|---|
| Emulsion No. | Fog | Sensitivity | Fog | Sensitivity |
| 31 (Comparative Example) | 0.18 | 100 | 0.18 | 95 |
| 32 (Comparative Example) | 0.21 | 119 | 0.22 | 115 |
| 33 (Comparative Example) | 0.16 | 85 | 0.16 | 79 |
| 34 (Invention) | 0.17 | 132 | 0.18 | 130 |
| 35 (Comparative Example) | 0.15 | 79 | 0.15 | 73 |
| 36 (Comparative Example) | 0.14 | 85 | 0.13 | 85 |
| 37 (Invention) | 0.22 | 120 | 0.35 | 90 |
| 38 (Invention) | 0.18 | 135 | 0.33 | 95 |
| 39 (Invention) | 0.20 | 128 | 0.22 | 125 |
| 40 (Invention) | 0.18 | 143 | 0.19 | 140 |

Table 9 shows the photographing characteristics of samples obtained by chemically sensitizing emulsions 31, 32, 35, and 40, without using any spectral sensitizing dye, and also those of samples obtained by chemically sensitizing emulsions 31, 32, 35, and 40 with spectral sensitizing dye B. The samples containing no spectral sensitizing dyes were exposed through a blue filter for 1/100 second, whereas those containing dye B were exposed through a yellow filter for 1/100 second. Their sensitivities were measured at a point from fog by an optical density of 0.2.

TABLE 9

| Emulsion | Dye | Remarks | Fog | Sensitivity |
|---|---|---|---|---|
| 31 | not used | Comparative Example | 0.15 | 100 |
| 32 | not used | Comparative Example | 0.16 | 125 |
| 35 | not used | Comparative Example | 0.13 | 100 |
| 40 | not used | Invention | 0.15 | 145 |
| 31 | Dye B | Comparative Example | 0.23 | 100 |
| 32 | Dye B | Comparative Example | 0.25 | 115 |
| 35 | Dye B | Comparative Example | 0.16 | 80 |

TABLE 9-continued

| Emulsion | Dye | Remarks | Fog | Sensitivity |
|---|---|---|---|---|
| 40 | Dye B | Invention | 0.19 | 147 |

As is evident from Table 8, the emulsion which had been reduction sensitized with L-ascorbic acid exhibited higher sensitivity when the surface iodine content is 5.7 mol% (emulsion 34), and more higher sensitivity when the surface iodine content is 7.5 mol% (emulsion 46), than when its surface iodine content is 2.5 mol% measured by the XPS analysis (emulsion 32). Table 9 also teaches that a combination of the specified amount of a surface iodine content and the reduction sensitization with L-ascorbic acid gives preferred results. Further, as the comparison between emulsion 39 and emulsion 40 indicate, the combined use of L-ascorbic acid and thiosulfonic acid gives better results. Still further, as comparison of emulsions 37, 38, and 40 reveals, the reduction sensitization using L-ascorbic acid not only imparts better results than using the other reduction sensitizer, but also more suppresses the increase in fog and the deterioration of sensitivity, which occurred with time after the coating of the samples on supports.

EXAMPLE 4

Various dyes were added to chemically sensitized emulsions 32, 35, 38, and 40, thereby forming red-sensitive, green-sensitive, and blue-sensitive emulsions.

A plurality of supports made of triacetylcellulose film were prepared, which had been undercoated. The red-sensitive, green-sensitive, and blue-sensitive emulsions were coated on these supports. Layers of the following compositions were formed on each support, thus preparing samples 301 to 304, which were multi-layer, color light-sensitive materials. Composition of Light-Sensitive Layers The numeral values specified below indicate the amounts coated, in the unit of g/m$^2$. As for silver halide, the amount coated is specified as an amount of silver in g/m$^2$. The amount of each sensitizing layer is represented in terms of mole per mole of the silver halide contained in the same layer.

| | |
|---|---|
| Layer 1: Antihalation Layer | |
| Black Colloidal Silver | 0.2 |
| coating silver amount | |
| Gelatin | 2.2 |
| UV-1 | 0.1 |
| UV-2 | 0.2 |
| Cpd-1 | 0.05 |
| Solv-1 | 0.01 |
| Solv-2 | 0.01 |
| Solv-3 | 0.08 |
| Layer 2: Interlayer | |
| Fine Silver Bromide Grain (sphere-equivalent diameter = 0.07 μm) | 0.15 |
| coating silver amount | |
| Gelatin | 1.0 |
| ExC-4 | 0.03 |
| Cpd-2 | 0.2 |
| Layer 3: 1st Red-Sensitive Emulsion Layer | |
| Silver Iodobromide Emulsion (AgI = 8.5 mol %, internally high AgI type, sphere-equivalent diameter = 0.1 μm, variation coefficient of sphere-equivalent diameter = 25%, diameter/thickness ratio = 3.0) | 0.42 |
| coating silver amount | |
| Silver Iodobromide Emulsion (AgI = 4.0 mol %, internally high AgI type, sphere-equivalent diameter = 0.4 μm, variation coefficient of sphere-equivalent diameter = 22%, tetradecahedral grain) | 0.33 |
| coating silver amount | |
| Gelatin | 1.0 |
| ExS-1 | $4.5 \times 10^{-4}$ |
| ExS-2 | $1.5 \times 10^{-4}$ |
| ExS-3 | $0.4 \times 10^{-4}$ |
| ExC-1 | 0.40 |
| ExC-2 | 0.11 |
| ExC-3 | 0.009 |
| ExC-4 | 0.023 |
| Solv-1 | 0.24 |
| Layer 4: 2nd Red-Sensitive Emulsion Layer | |
| Silver Iodobromide Emulsion (AgI = 8.5 mol %, internally high AgI type, sphere-equivalent diameter = 1.0 μm, variation coefficient of sphere-equivalent diameter = 25%, tabular grain, diameter/thickness ratio = 3.0) | 0.55 |
| coating silver amount | |
| Gelatin | 0.7 |
| ExS-1 | $3 \times 10^{-4}$ |
| ExS-2 | $1 \times 10^{-4}$ |
| ExS-3 | $0.3 \times 10^{-4}$ |
| ExC-1 | 0.10 |
| ExC-2 | 0.55 |
| ExC-4 | 0.025 |
| Layer 5: 3rd Red-Sensitive Emulsion Layer | |
| Silver Iodobromide Emulsion I (AgI = 11.3 mol %, internally high AgI type, sphere-equivalent diameter = 1.4 μm, variation coefficient of sphere-equivalent diameter = 28%, tabular gain, diameter/thickness ratio = 6.0) | 1.29 |
| coating silver amount | |
| Gelatin | 0.6 |
| ExS-1 | $2 \times 10^{-4}$ |
| ExS-2 | $0.6 \times 10^{-4}$ |
| ExS-3 | $0.2 \times 10^{-4}$ |
| ExC-2 | 0.08 |
| ExC-4 | 0.01 |
| ExC-5 | 0.06 |
| Solv-1 | 0.12 |
| Solv-2 | 0.12 |
| Layer 6: Interlayer | |
| Gelatin | 1.0 |
| Cpd-4 | 0.1 |
| Solv-1 | 0.1 |
| Layer 7: 1st Green-Sensitive Emulsion Layer | |
| Silver Iodobromide Emulsion (AgI = 8.5 mol %, internally high AgI type, sphere-equivalent diameter = 1.0 μm, variation coefficient of sphere-equivalent diameter = 25%, tubular grain, diamter/thickness ratio = 3.0) | 0.28 |
| coating silver amount | |
| Silver Iodobromide Emulsion (AgI = 4.0 mol %, internally high AgI type, sphere-equivalent diameter = 0.7 μm, variation coefficient of sphere-equivalent diameter = 38%, tubular grain, diameter/thickness ratio = 2.0) | 0.1 |
| coating silver amount | |
| Gelatin | 1.2 |
| ExS-5 | $5 \times 10^{-4}$ |
| ExS-6 | $2 \times 10^{-4}$ |
| ExS-7 | $1 \times 10^{-4}$ |
| ExM-1 | 0.50 |
| ExM-2 | 0.10 |
| ExM-5 | 0.03 |
| Solv-1 | 0.2 |
| Solv-5 | 0.03 |
| Layer 8: 2nd Green-Sensitive Emulsion Layer | |
| Silver Iodobromide Emulsion (AgI = 8.5 mol %, internally high iodide type, sphere-equivalent diameter = 1.0 μm, variation coefficient of sphere-equivalent diameter = 25%, tabular grain, diameter/thickness ratio = 3.0) | 0.47 |
| coating silver amount | |
| Gelatin | 0.35 |
| ExS-5 | $3.5 \times 10^{-4}$ |
| ExS-6 | $1.4 \times 10^{-4}$ |
| ExS-7 | $0.7 \times 10^{-4}$ |
| ExM-1 | 0.12 |

-continued

| | |
|---|---|
| ExM-2 | 0.01 |
| ExM-3 | 0.01 |
| Solv-1 | 0.15 |
| Solv-4 | 0.03 |
| Layer 9: Interlayer | 0.5 |
| Gelatin | |
| Layer 10: 3rd Green-Sensitive Emulsion Layer | |
| Silver Iodobromide Emulsion II (AgI = 11.3 mol %, internally high AgI type, sphere-equivalent diameter = 1.4 μm, variation coefficient of sphere-equivalent diameter = 28%, diameter/thickness ratio = 6.0) | 1.3 |
| coating silver amount | |
| Gelatin | 0.8 |
| ExS-5 | $2 \times 10^{-4}$ |
| ExS-6 | $0.8 \times 10^{-4}$ |
| ExS-7 | $0.8 \times 10^{-4}$ |
| ExM-3 | 0.01 |
| ExM-4 | 0.04 |
| ExC-4 | 0.005 |
| Cpd-5 | 0.01 |
| Solv-1 | 0.2 |
| Layer 11: Yellow Filter Layer | |
| Cpd-3 | 0.05 |
| Gelatin | 0.5 |
| Solv-1 | 0.1 |
| Layer 12: Interlayer | |
| Gelatin | 0.5 |
| Cpd-2 | 0.1 |
| Layer 13: 1st Blue-Sensitive Emulsion Layer | |
| Silver Iodobromide Emulsion (AgI = 10 mol %, internally high iodide type, sphere-equivalent diameter = 0.7 μm, variation coefficient of sphere-equivalent diameter = 14%, tetra-decahedral grain) | 0.1 |
| coating silver amount | |
| Silver Iodobromide Emulsion (AgI = 4.0 mol %, internally high iodide type, sphere-equivalent diameter = 0.4 μm, variation coefficient of sphere-equivalent diameter = 22%, tetra-decahedral grain) | 0.05 |
| coating silver amount | |
| Gelatin | 1.0 |
| ExS-8 | $3 \times 10^{-4}$ |
| ExY-1 | 0.60 |
| ExY-2 | 0.02 |
| Solv-1 | 0.15 |
| Layer 14: 2nd Blue-Sensitive Emulsion Layer | |
| Silver Iodobromide Emulsion (AgI = 19.0 mol %, internally high AgI type, sphere-equivalent diameter = 1.0 μm, variation coefficient of sphere-equivalent diameter = 16%, tetra-decahedral grain) | 0.19 |
| coating silver amount | |
| Gelatin | 0.3 |
| ExS-8 | $2 \times 10^{-4}$ |
| ExY-1 | 0.22 |
| Solv-1 | 0.07 |
| Layer 15: Interlayer | |
| Fine Silver Iodobromide Grain (AgI = 2 mol %, homogeneous type, sphere-equivalent diameter = 0.13 μm) | |
| coating silver amount | 0.2 |
| Gelatin | 0.36 |
| Layer 16: 3rd Blue-Sensitive Emulsion Layer | |
| Silver Iodobromide Emulsion III (AgI = 11.3 mol %, internally high AgI type, sphere-equivalent diameter = 1.4 μm, variation coefficient of sphere-equivalent diameter = 28% tubular grain, diameter/thickness ratio = 6.0) | 1.35 |
| coating silver amount | |
| Gelatin | 0.5 |
| ExS-9 | $1.5 \times 10^{-4}$ |
| ExY-1 | 0.2 |
| Solv-1 | 0.07 |
| Layer 17: 1st Protective Layer | |
| Gelatin | 1.8 |
| UV-1 | 0.1 |
| UV-2 | 0.2 |
| Solv-1 | 0.01 |

-continued

| | |
|---|---|
| Solv-2 | 0.01 |
| Layer 18: 2nd Protective Layer | |
| Fine Silver Bromide Grain (sphere-equivalent diameter = 0.07 μm) | |
| coating silver amount | 0.36 |
| Gelatin | 0.7 |
| Polymethylmethacrylate Grain (diameter = 1.5 μm) | 0.2 |
| W-1 | 0.02 |
| H-1 | 0.4 |
| Cpd-6 | 1.0 |

Names of chemical structures of the compounds used in samples 301 to 304 are listed in Table C to be presented later.

These samples were subjected to sentimetry exposure, and the following color development was performed.

The densities of the processed samples were measured by using a red filter, a green filter, and a blue filter. The densities thus measured were shown in Table 10.

To determine the photographing characteristics of the samples, the sensitivities of the red-sensitive layer, green-sensitive layer and blue-sensitive layers of each sample were measured, which are relative to the sensitivity of sample 302 taken as being 100.

The color development was performed under the following conditions at 38° C.

1. Color Development—3 min. 15 sec.
2. Bleaching—6 min. 30 sec.
3. Washing—2 min. 10 sec.
4. Fixing—4 min. 20 sec.
5. Washing—3 min. 15 sec.
6. Stabilizing—1 min. 05 sec.

The compositions of the processing solutions used were as follows:

| | |
|---|---|
| Color Developer | |
| Diethylenetriaminepentaacetic acid | 1.0 g |
| 1-hydroxyethylidene-1,1-diphosphone | 2.0 g |
| Sodium sulfite | 4.0 g |
| Potassium carbonate | 30.0 g |
| Potassium bromide | 1.4 g |
| Potassium Iodide | 1.3 mg |
| Hydroxylamine sulfate | 2.4 g |
| 4-(N-ethyl-N-β-hydroxyethyl-amino)-2-methylaniline sulfate | 2.4 g |
| Water to make | 1.0 l |
| pH | 10.0 |
| Bleaching Solution | |
| Ferric ammonium ethylene-diaminetetraacetate | 100.0 g |
| Disodium ethyleneamine-tetraacetate | 10.0 g |
| Ammonium bromide | 150.0 g |
| Ammonium nitriate | 10.0 g |
| Water to make | 1.0 l |
| pH | 6.0 |
| Fixing Solution | |
| Sodium ethylenediamine-tetraacetate | 1.0 g |
| Sodium sulfite | 4.0 g |
| Aqueous solution (70%) of ammonium thiosulfate | 175.0 ml |
| Sodium bisulfite | 4.6 g |
| Water to make | 1.0 l |
| pH | 6.6 |
| Stabilizing Solution | |
| Formalin (40%) | 2.0 ml |
| Polyoxyethyline-p-monononyl-phenylether (average polymerization degree = 10) | 0.3 g |
| Water to make | 1.0 l |

As is evident from Table 10, the emulsions according to the invention had sufficiently high sensitivities. Although they had high sensitivities, they exhibited sufficiently low fog.

TABLE 10

| Sample No. | Layer 5 Silver Iodobromide Emulsion I | Layer 10 Silver Iodobromide Emulsion II | Layer 16 Silver Iodobromide Emulsion III | Red-Sensitive Layer | | Green-Sensitive Layer | | Blue-Sensitive Layer | |
|---|---|---|---|---|---|---|---|---|---|
| | | | | Sensitivity | Fog | Sensitivity | Fog | Sensitivity | Fog |
| 301 (Comparative Example) | Em-32 | Em-32 | Em-32 | 108 | 0.18 | 108 | 0.18 | 110 | 0.22 |
| 302 (Comparative Example) | Em-35 | Em-35 | Em-35 | 100 | 0.15 | 100 | 0.16 | 100 | 0.18 |
| 303 (Present Invention) | Em-38 | Em-38 | Em-38 | 125 | 0.16 | 130 | 0.17 | 130 | 0.19 |
| 304 (Present Invention) | Em-40 | Em-40 | Em-40 | 133 | 0.15 | 138 | 0.16 | 135 | 0.18 |

Samples 303 and 304 were left to stand for two months in an atmosphere wherein the temperature and the relative humidity were maintained at 23° C. and 55%, respectively. Then, these samples were subjected to sentimetry exposure, and a color development was performed. Although the red-sensitive, green-sensitive and blue-sensitive layers of sample 303 had their respective sensitivities reduced due to an increase in fog, those of the sample 304 did not have their sensitivities reduced.

Hitherto it has been difficult to increase the sensitivity by reduction sensitization on the spectrally sensitized emulsions. The inventors hereof have found that the increase in sensitivity of the spectrally sensitized regions can be achieved when the silver halide grains containing 5 to 30 mol% of silver iodide on their surfaces are reduction-sensitized. For example, if double-structured silver halide grains have not been reduction-sensitized during their growth, the increase in the amoount of silver bromide in the shell gives rise to a decrease in sensitivity of spectrally sensitized regions.

Another unexpected advantage of the present invention is that the photographic light-sensitive material of the invention is hardly degraded by natural radiations.

$CH_3SO_2SNa$ (1-1)
$C_2H_5SO_2SNa$ (1-2)
$C_3H_7SO_2SK$ (1-3)
$C_4H_9SO_2SLi$ (1-4)
$C_6H_{13}SO_2SNa$ (1-5)
$C_8H_{17}SO_2SNa$ (1-6)
$CH_3(CH_2)_3CH(C_2H_5)CH_2SO_2S.NH_4$ (1-7)

$C_{10}H_{21}SO_2SNa$ (1-8)
$C_{12}H_{25}SO_2SNa$ (1-9)
$C_{16}H_{33}SO_2SNa$ (1-10)

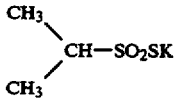
(1-11)

$t\text{-}C_4H_9SO_2SNa$ (1-12)
$CH_3OCH_2CH_2SO_2S.Na$ (1-13)

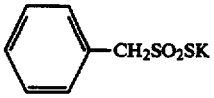
(1-14)

-continued $CH2{=}CHCH_2SO_2SNa$ (1-15)

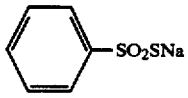
(1-16)

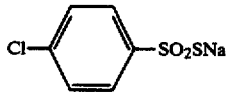
(1-17)

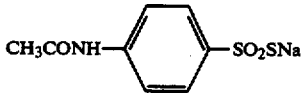
(1-18)

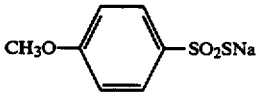
(1-19)

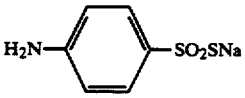
(1-20)

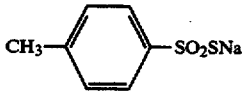
(1-21)

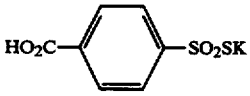
(1-22)

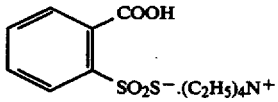
(1-23)

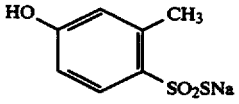
(1-24)

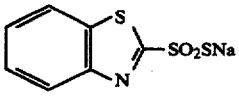
(1-25)

-continued
(1-26)
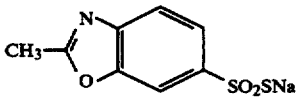
(1-27)
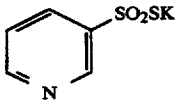
(1-28)
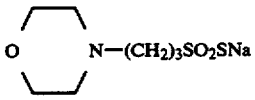
$KSSO_2(CH_2)_2SO_2SK$ (1-29)
$NaSSO_2(CH_2)_4SO_2SNa$ (1-30)
$NaSSO_2(CH_2)_4S(CH_2)_4(CH_2)_4SO_2SNa$ (1-31)
(1-32)
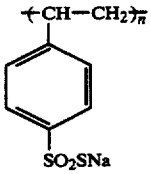
(1-33)
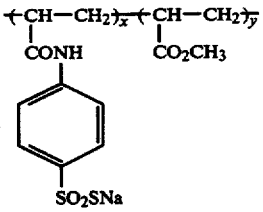
x:y = 1/1 (molor ratio)
$C_2H_5SO_2S-CH_3$ (2-1)
$C_8H_{17}SO_2SCH_2CH_3$ (2-2)
(2-3)
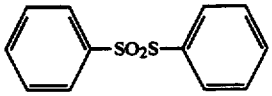
(2-4)
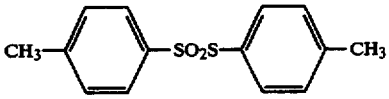
$C_2H_5SO_2SCH_2CH_2CN$ (2-5)
(2-6)
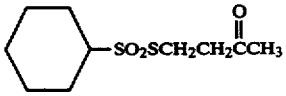
(2-7)
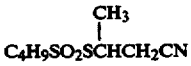
(2-8)
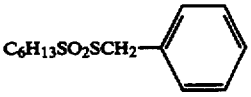
(2-9)
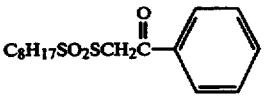
-continued
(2-10)
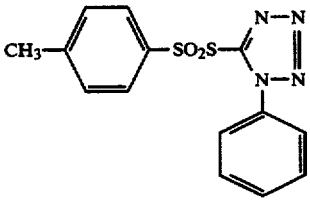
(2-11)
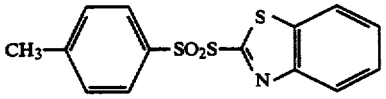
(2-12)
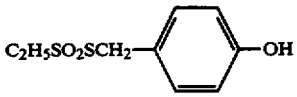
(2-13)
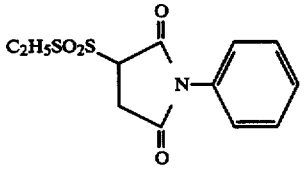
(2-14)
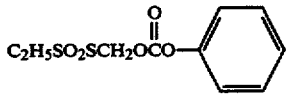
(2-15)
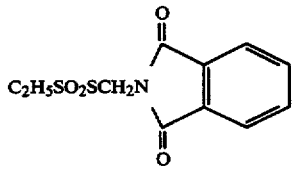
(2-16)
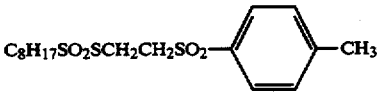
(2-17)
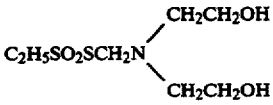
$C_2H_5SO_2SCH_2CH_2CH_2CH_2OH$ (2-18)
(2-19)
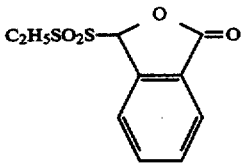
(2-20)
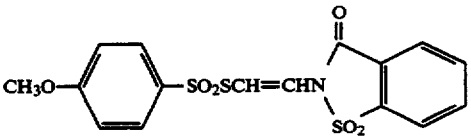
$CH_3SSO_2(CH_2)_4SO_2SCH_3$ (2-21)
$CH_3SSO_2(CH_2)_2SO_2SCH_3$ (2-22)

-continued
(2-23)
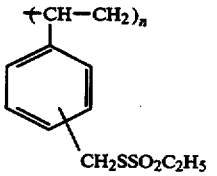
(2-24)
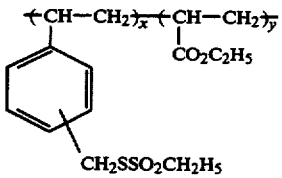
x:y = 2/1 (molar ratio)
$(CH_2)_4$ (2-25)
$SO_2.S$
(3-1)
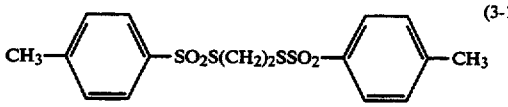
$C_2H_5SO_2SCH_2CH_2SO_2CH_2CH_2SSO_2C_2H_5$ (3-2)
-continued
(3-3)
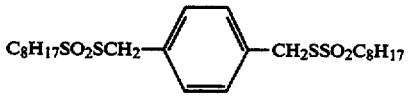
$C_2H_5SO_2SCH_2N(CH_2CH_2)NCH_2SSO_2C_2H_5$ (3-4)
$CH_2CH_2OH$ $CH_2CH_2OH$
(3-5)
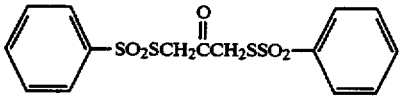
(3-6)
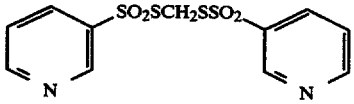
$C_2H_5SO_2SSSO_2C_2H_5$ (3-7)
(n)$C_3H_7SO_2SSSO_2C_3H_7$(n) (3-8)
(3-9)
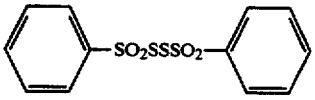
TABLE B
U-1
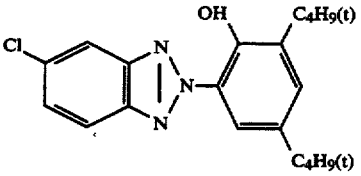
U-2
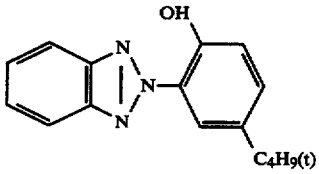
U-3
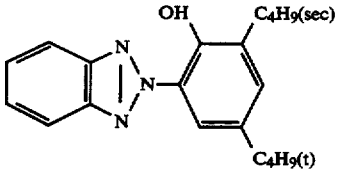
U-4
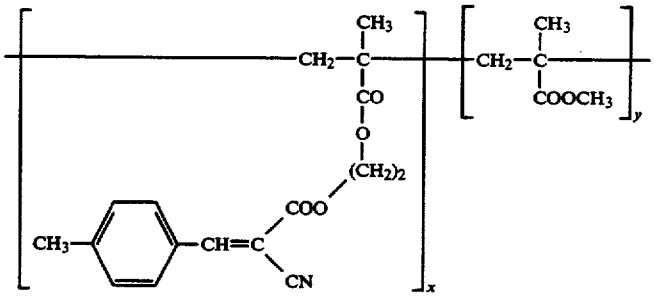
x:y = 7:3 (weight ratio)

TABLE B-continued
U-5
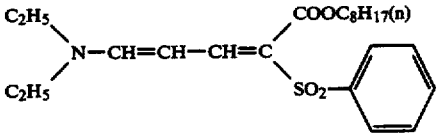
EX-1
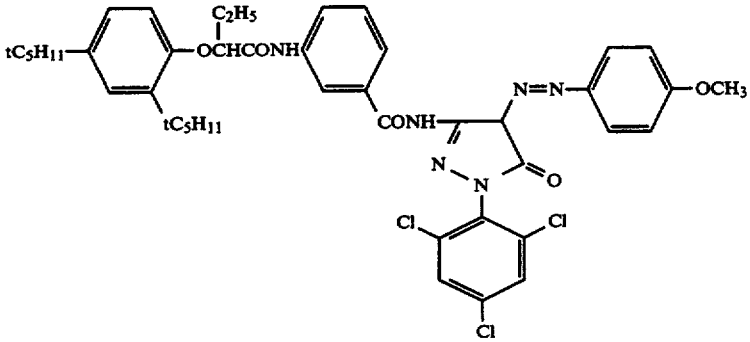
EX-2
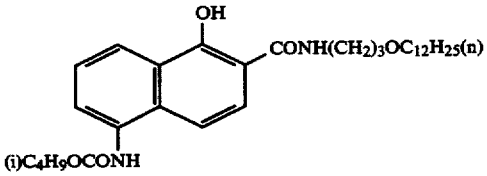
EX-3
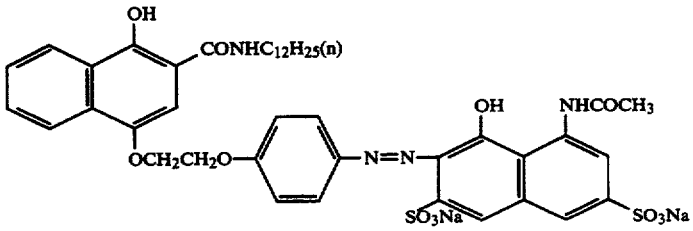
EX-4
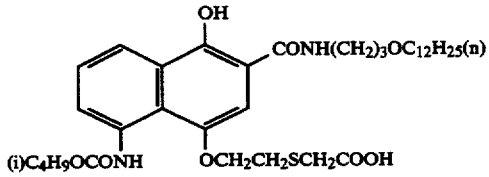
EX-5
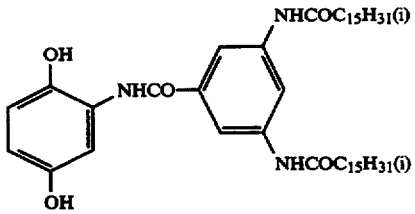

TABLE B-continued
EX-6
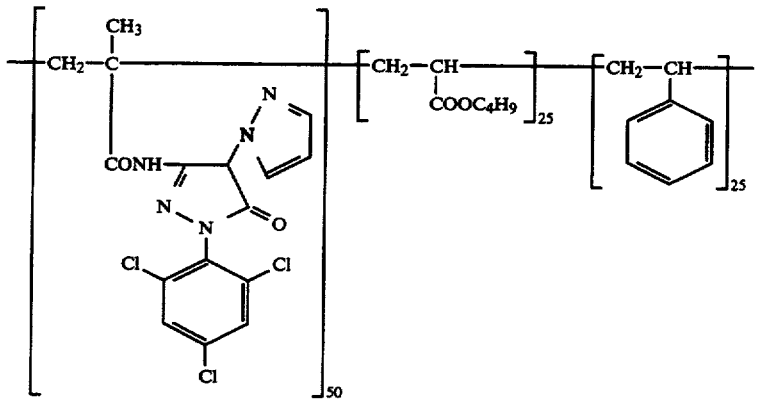
Average molecular weight 30,000
EX-7
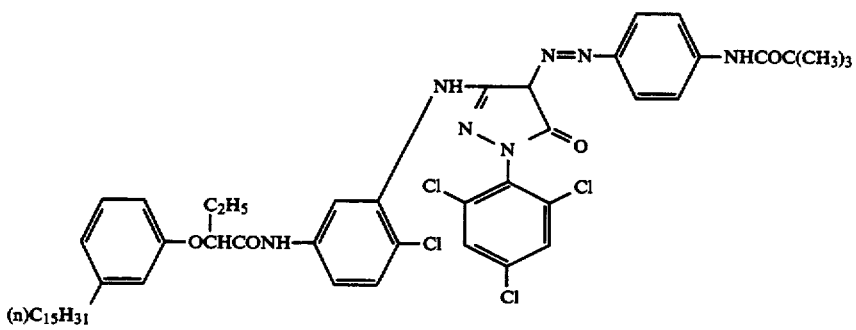
EX-8
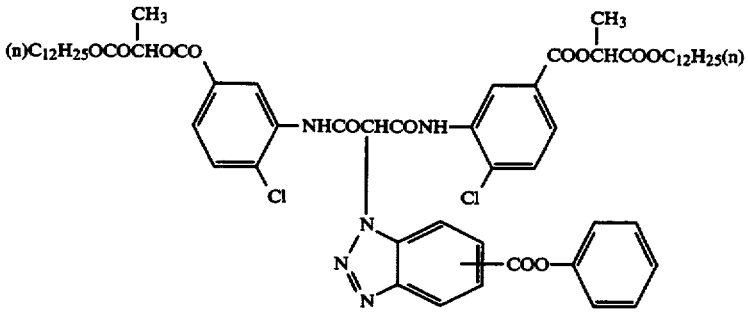
EX-9
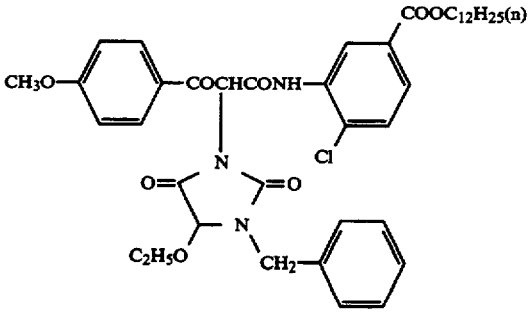

TABLE B-continued
EX-10
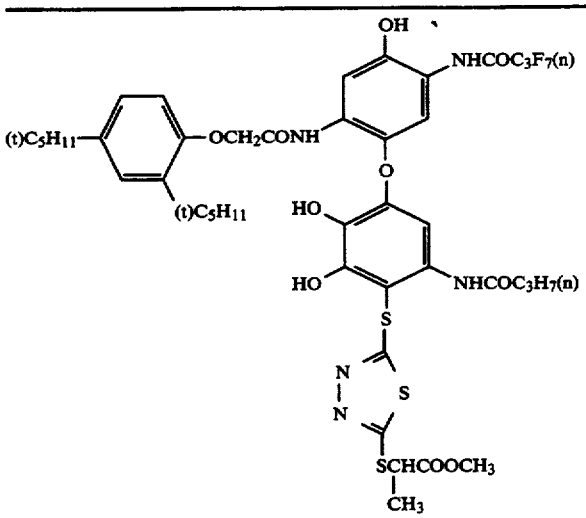
EX-11
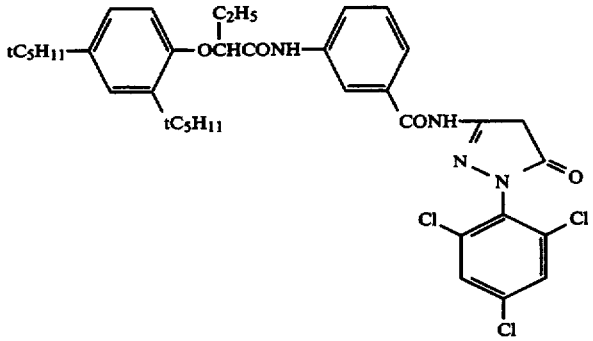
EX-12
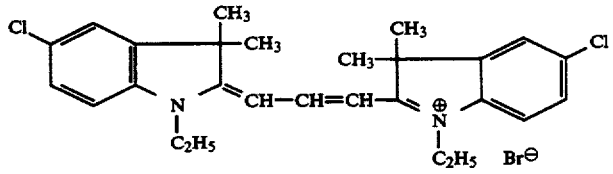
S-1
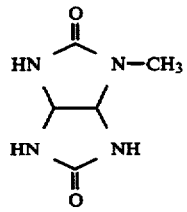
S-2
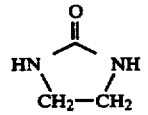
tricresyl phosphate HBS-1
dibutyl phthalate HBS-2
bis(2-ethylhexyl)phthalate HBS-3
HBS-4
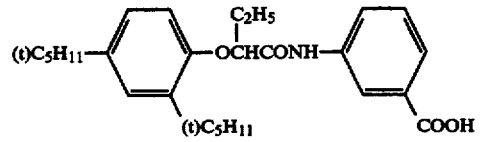

TABLE B-continued
$CH_2{=}CH{-}SO_2{-}CH_2CONH{-}CH_2$
$CH_2{=}CH{-}SO_2{-}CH_2{-}CONH{-}CH_2$ H-1
Sensitizing Dyes
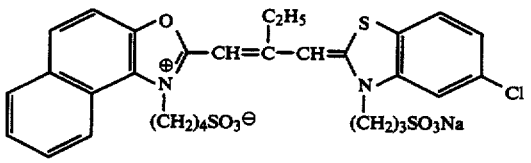
I
TABLE C
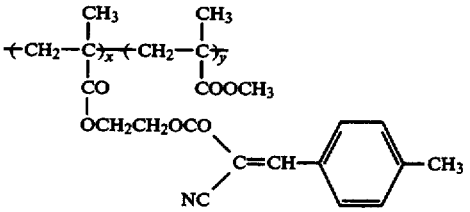
UV-1
x/y = 7/3 (weight ratio)
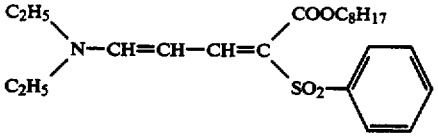
UV-2
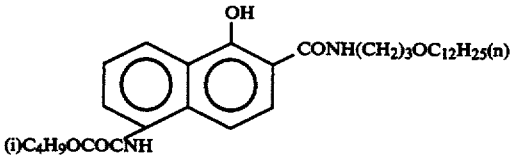
ExC-1
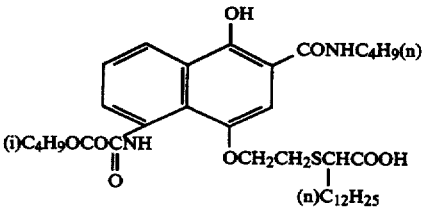
ExC-2
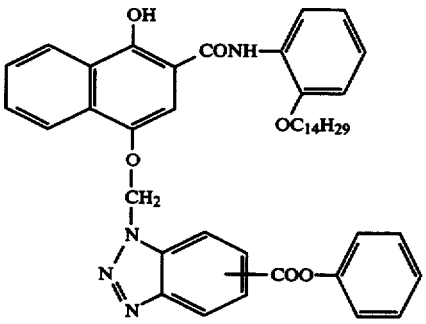
ExC-3

TABLE C-continued
ExC-4
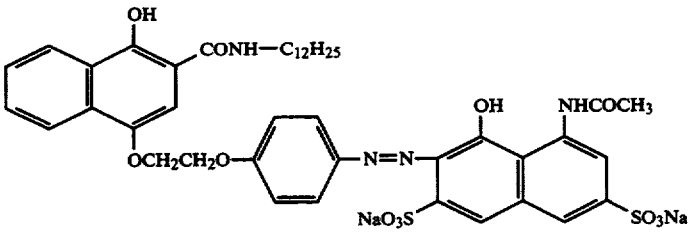
ExC-5
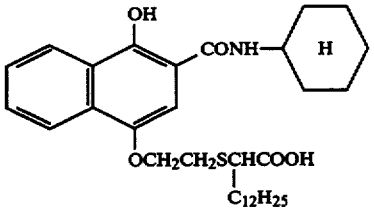
ExM-1
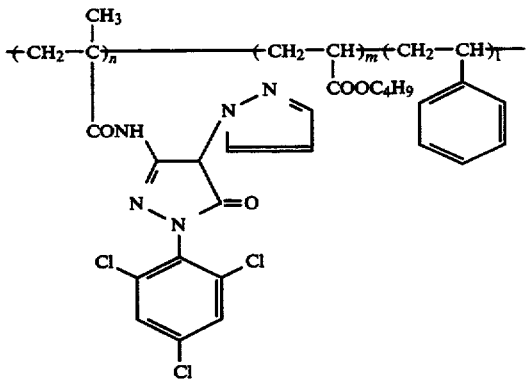
n:m:l = 2:1:1 (weight ratio) average molecular weight 40,000
ExM-2
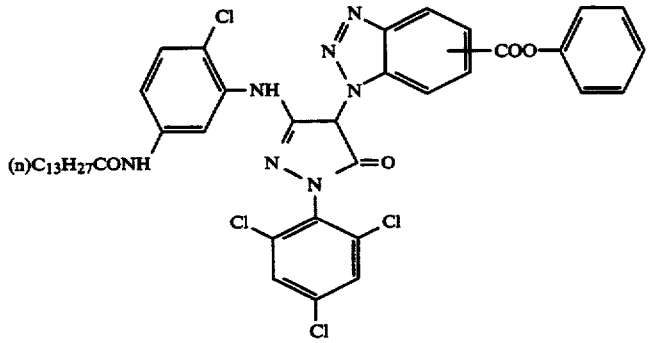
ExM-3
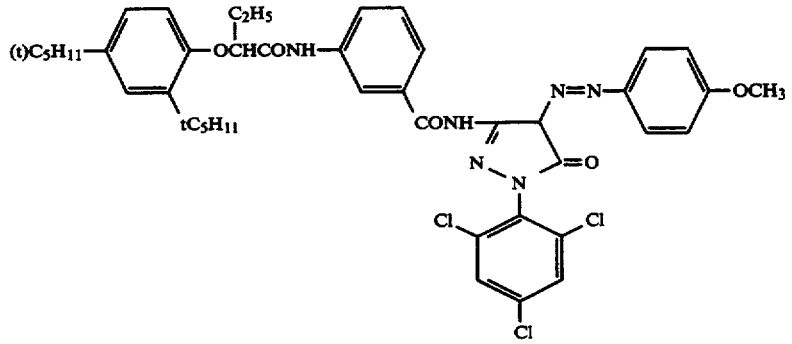

TABLE C-continued
ExM-4
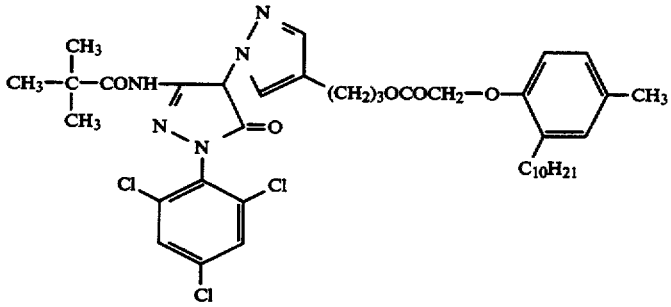
ExM-5
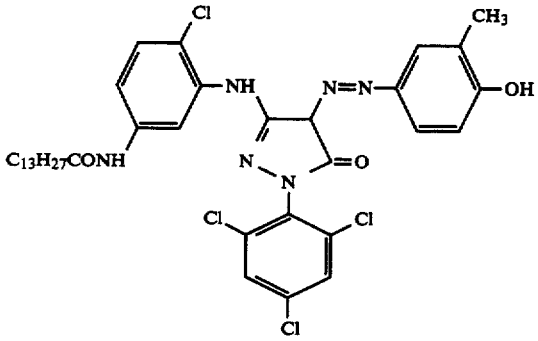
ExY-1
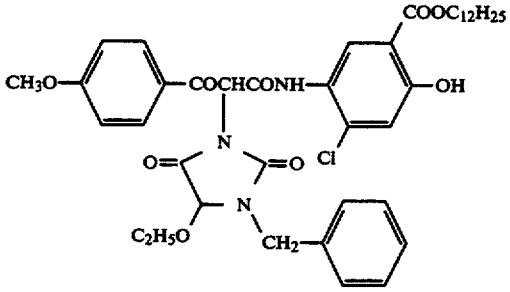
ExY-2
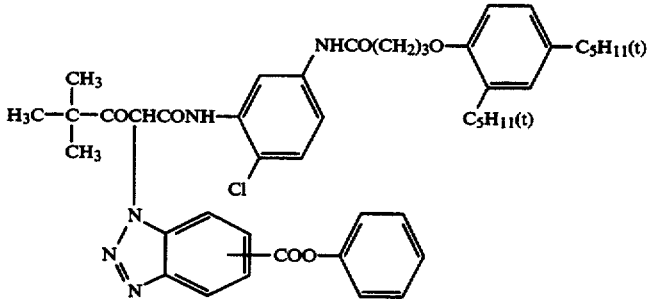
ExS-1
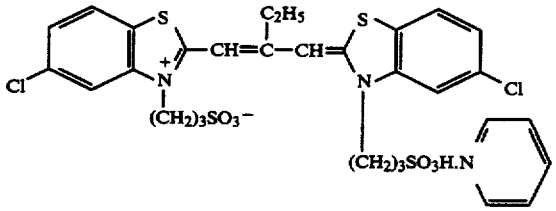

TABLE C-continued
ExS-2
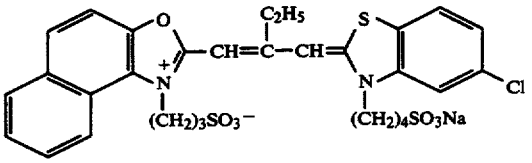
ExS-3
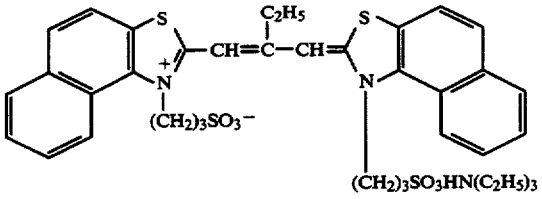
ExS-5
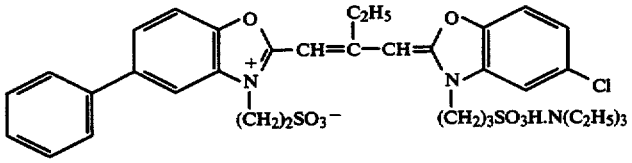
ExS-6
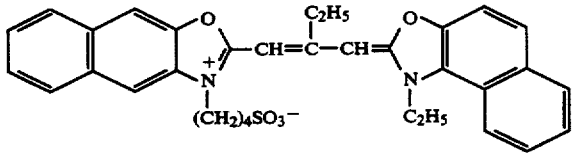
ExS-7
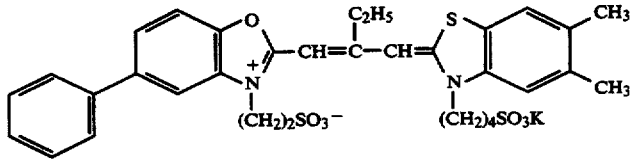
ExS-8
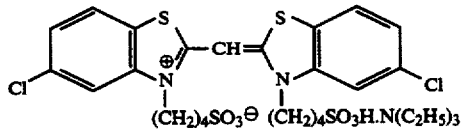
ExS-9
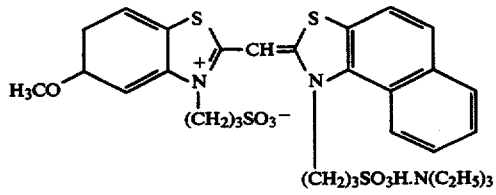
Solv-1
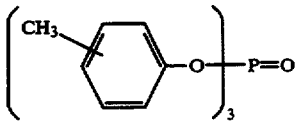
Solv-2
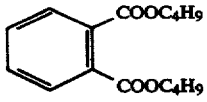

TABLE C-continued
Solv-3
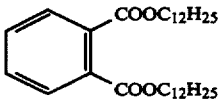
Solv-4
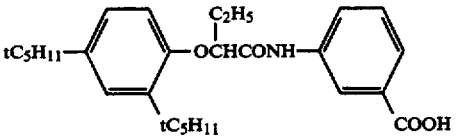
Cpd-1
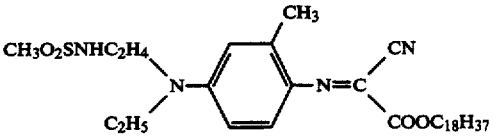
Cpd-2
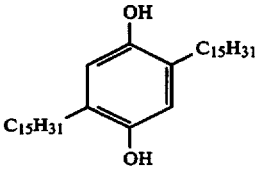
Cpd-3
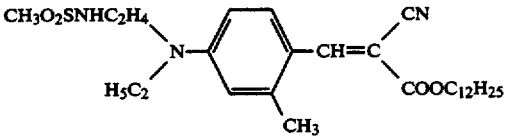
Cpd-4
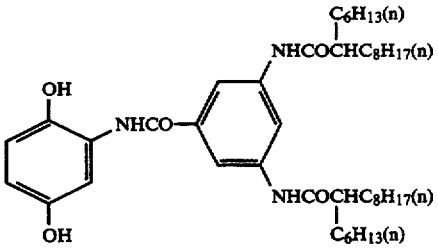
Cpd-5
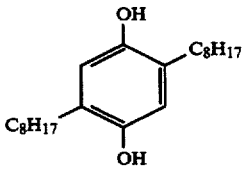
Cpd-6
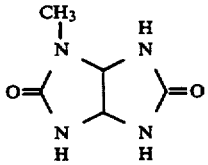
W-1
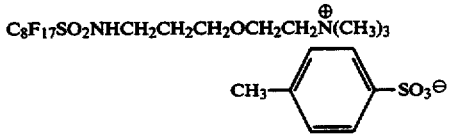
H-1
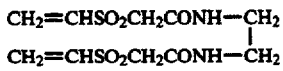
What is claimed is:

$$R—SO_2S—M \quad [I]$$

where R is an aliphatic group, an aromatic group, or a heterocyclic group, and M is a cation.

2. The silver halide photographic light-sensitive material according to claim 1, wherein said silver halide grains are gold plus sulfur sensitized after subjected to the reduction sensitization.

3. The silver halide photographic light-sensitive material according to claim 1, wherein said reduction sensitization is performed by using at least one ascorbic acid compound.

4. The silver halide photographic light-sensitive material according to claim 3, wherein said ascorbic acid compound is used in an amount of $5\times10^{-5}$ mol to $1\times10^{-1}$ mol per one mol of silver halide.

5. The silver halide photographic light-sensitive material according to claim 1, wherein said chemical sensitization is performed in the presence of at least one spectrally sensitizing dye.

6. The silver halide photographic light-sensitive material according to claim 1, wherein said silver halide grains are in tabular form.

7. The silver halide photographic light-sensitive material according to claim 1, wherein not less than 50% of a total projected area of all silver halide grains are occupied by tabular grains having an aspect ratio of 3 to 8.

8. The silver halide photographic light-sensitive material according to claim 1, wherein said silver halide grains have a projected area diameter of 0.5 to 2 $\mu$m.

9. The silver halide photographic light-sensitive material according to claim 1, containing at least one of yellow, magenta and cyan couplers.

10. The silver halide photographic light-sensitive material according to claim 9, containing at least one development inhibitor-releasing DIR coupler.

11. The silver halide photographic light-sensitive material according to claim 1, wherein said silver halide is silver iodobromide or iodochlorobromide containing 1 to 30 mol% of silver iodide.

12. The silver halide photographic light-sensitive material according to claim 1, wherein the silver halide grain contains 7.5 to 15 mol% of silver iodide on its surface.

13. The silver halide photographic light-sensitive material according to claim 1, wherein the silver halide grain contains 10 to 15 mol% of silver iodide on its surface.

* * * * *

UNITED STATES PATENT AND TRADEMARK OFFICE

CERTIFICATE OF CORRECTION

PATENT NO. : Re. 35,003

DATED : July 25, 1995

INVENTOR(S) : TAKADA

It is certified that error appears in the above-indentified patent and that said Letters Patent is hereby corrected as shown below:

On the title page, please make the following change:

[*] Notice: The portion of the term of this patent subsequent to [Oct. 29, 2008] June 27, 2009 has been disclaimed.

Signed and Sealed this

Twenty-second Day of October, 1996

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE. 35,003
DATED : July 25, 1995
INVENTOR(S) : Shunji TAKADA

It is certified that error appears in the above-identified patent and that said Letters Patent is hereby corrected as shown below:

Column 59, lines 1-5 should be deleted and insert therefor claim 1, as follows:

1. A silver halide photographic light-sensitive material comprising a support and at least one layer of silver halide emulsion formed on the support, said emulsion layer containing silver halide grains which have been subjected both to reduction sensitization while growing and to at least one chemical sensitization selected from the group consisting of gold sensitization, <u>and sulfur sensitization</u> each of said grains having at least 5 mol% of silver iodide on a surface thereof, said reduction sensitization being performed in the presence of at least one compound selected from the group consisting of the compounds represented by formula [I]:

$$R\text{–}SO_2S\text{–}M \qquad [I]$$

UNITED STATES PATENT AND TRADEMARK OFFICE

CERTIFICATE OF CORRECTION

PATENT NO. : RE. 35,003

DATED : July 25, 1995

INVENTOR(S) : Shunji TAKADA

It is certified that error appears in the above-identified patent and that said Letters Patent is hereby corrected as shown below:

where R is an aliphatic group, an aromatic group, or a heterocyclic group, and M is a cation.

Signed and Sealed this

Nineteenth Day of January, 1999

*Attest:*

*Attesting Officer*

*Acting Commissioner of Patents and Trademarks*